(12) United States Patent
Deng et al.

(10) Patent No.: US 12,534,385 B2
(45) Date of Patent: *Jan. 27, 2026

(54) MATERIALS AND METHODS OF PRODUCING LITHIUM COBALT OXIDE MATERIALS OF A BATTERY CELL

(71) Applicant: eJoule, Inc., Fremont, CA (US)

(72) Inventors: Haixia Deng, Fremont, CA (US);
Shengfeng Liu, Newark, CA (US);
Min-Duan Liu, Bethany, CT (US);
Mengchen Liu, Union City, CA (US);
Liang-Yuh Chen, Saratoga, CA (US)

(73) Assignee: eJoule, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/761,255

(22) Filed: Jul. 1, 2024

(65) Prior Publication Data

US 2024/0351910 A1    Oct. 24, 2024

Related U.S. Application Data

(63) Continuation of application No. 17/478,855, filed on Sep. 17, 2021, now Pat. No. 12,151,949.

(Continued)

(51) Int. Cl.
    C01G 51/42    (2025.01)
    H01M 4/525    (2010.01)
    H01M 10/0525  (2010.01)

(52) U.S. Cl.
    CPC ............ C01G 51/42 (2013.01); H01M 4/525 (2013.01); H01M 10/0525 (2013.01); C01P 2006/40 (2013.01)

(58) Field of Classification Search
    None
    See application file for complete search history.

(56) References Cited

U.S. PATENT DOCUMENTS 6,383,235 B1    5/2002   Maegawa et al.
6,511,516 B1 *  1/2003   Johnson .............. H01M 4/0419
                                                29/623.1

(Continued)

FOREIGN PATENT DOCUMENTS

CN    105958048 A1    9/2016
CN    109809497 A1    1/2019

(Continued)

OTHER PUBLICATIONS

EP21870387_extended European search report and opinion, Oct. 4, 2024.

(Continued)

Primary Examiner — Eli S Mekhlin
(74) Attorney, Agent, or Firm — JAS Law LLP; Ya-Fen Chen

(57) ABSTRACT

Various lithium cobalt oxides materials having a chemical formula of $Li_x Co_y O_z$, and method and apparatus of producing the various lithium cobalt oxides materials are provided. The method includes adjusting a molar ratio $M_{LiSalt}$:$M_{CoSalt}$ of a lithium-containing salt, and a cobalt-containing salt within a liquid mixture to be equivalent to a ratio of x:y, drying a mist of the liquid mixture in the presence of a gas to form a gas-solid mixture, separating the gas-solid mixture into one or more solid particles of an oxide material, and annealing the solid particles of the oxide material in the presence of another gas flow to obtain crystalized particles of the lithium cobalt oxide material. The process system has a mist generator, a drying chamber, one or more gas-solid separator, and one or more reactors.

21 Claims, 9 Drawing Sheets

Related U.S. Application Data

(60) Provisional application No. 63/080,023, filed on Sep. 18, 2020.

(56) References Cited

U.S. PATENT DOCUMENTS

| | | | |
|---|---|---|---|
| 8,241,789 | B2 | 8/2012 | Chiang et al. |
| 9,614,220 | B2 | 4/2017 | Paulsen et al. |
| 2009/0117471 | A1 | 5/2009 | Grey et al. |
| 2014/0272568 | A1* | 9/2014 | Frianeza-Kullberg ............... C01G 53/42 252/182.1 |
| 2018/0361338 | A1* | 12/2018 | Chen ................ H01M 4/0471 |

FOREIGN PATENT DOCUMENTS

| | | |
|---|---|---|
| EP | 1281673 B1 | 5/2003 |
| EP | 2314545 A1 | 4/2011 |
| EP | 3599222 A1 | 1/2020 |

OTHER PUBLICATIONS

EP21870388_extended European search report and opinion Sep. 9, 2024.

S Levasseur, M Ménétrier, C Delmas (2002), On the LixCo1—yMgyO2 system upon deintercalation: electrochemical, electronic properties and 7Li MAS NMR studies, Journal of Power Sources, vol. 112, Issue 2, pp. 419-427. https://doi.org/10.1016/S0378-7753(02)00456-1.

* cited by examiner

MATERIALS AND METHODS OF PRODUCING LITHIUM COBALT OXIDE MATERIALS OF A BATTERY CELL

CROSS-REFERENCE TO RELATED APPLICATIONS

This application is a continuation of U.S. patent application Ser. No. 17/478,855, filed on Sep. 17, 2021, which claims benefit of U.S. provisional patent application Ser. No. 63/080,023, filed on Sep. 18, 2020. All of the above-referenced applications are herein incorporated by reference.

BACKGROUND OF THE INVENTION

Great efforts have been devoted to the development of advanced electrochemical battery cells to meet the growing demand of various consumer electronics, electrical vehicles and grid energy storage applications in terms of high energy density, high power performance, high capacity, long cycle life, low cost and excellent safety. Thus, a need for more efficient utilization of the available energy resources as well as air-quality-control has generated an enormous interest in the development of advanced high energy density batteries for electric powered vehicles. Furthermore, cost effectiveness, great cycling life, stability, rechargeability, and better safety characteristics have been other factors driving the battery market.

In an electrochemically active battery cell, a cathode and an anode are immersed in an electrolyte and electronically separated by a separator. The separator is typically made of porous polymer membrane materials such that metal ions released from the electrodes into the electrolyte can diffuse through the pores of the separator and migrate between the cathode and the anode during battery charge and discharge. The type of a battery cell is usually named from the metal ions that are transported between its cathode and anode electrodes. Lithium ion battery is a secondary battery which was developed in the early 1990s and it represent a new generation of lightweight, compact, and yet high-energy power sources. However, the cost for commercially manufacturing various lithium battery materials is considerably higher than other types of secondary batteries.

Cathode active materials are the most expensive component in a lithium ion battery and, to a relatively large extent, determines the energy density, cycle life, manufacturing cost and safety of a lithium battery cell. Examples of good cathode active materials include nanometer- or micron-sized lithium transition metal oxide materials and lithium ion phosphate, etc. When lithium battery was first commercialized, lithium cobalt oxide ($LiCoO_2$) material is used as the cathode material. While the theoretical capacity of $LiCoO_2$ is about 274-275 mAh/g, and a capacity of the $LiCoO_2$ when using 4.2 V as an upper limit voltage is about 150 mAh/g.

To further increase the battery performance of $LiCoO_2$, one can increase charging cut-off voltage to extract more Li+. However, conventional material manufacturing processes such as solid-state reaction (e.g., mixing solid precursors and then calcination) and wet-chemistry processes (e.g., treating precursors in solution through co-precipitation, sol-gel, or hydrothermal reaction, etc., and then mixing and calcination) have notable challenges in promoting cycle stability of $LiCoO_2$ at high voltage. Since a high voltage is applied to $LiCoO_2$ materials, it is difficult to consistently produce $LiCoO_2$ having the characteristics of high stability and long battery life cycle at a level of industrial size.

In addition, solid-state diffusion rates affect the performance of resulting batteries made from these lithium oxide materials in applications requiring high-powered batteries. Overall, the processing time for such a solid-state multi-step batch manufacturing process will take up to a week so it is very labor intensive and energy consuming. Batch process also increases the chance of introducing impurity with poor run-to-run quality consistency and low overall yield. Specifically, co-precipitation is not suitable for the preparation of highly pure, accurate stoichiometric phases of these lithium-containing transition metal oxide battery materials.

Thus, there is a need for an improved method and system to manufacture high power performance, high capacity, long cycle life, excellent stability, properly crystalized, structured lithium metal oxide active materials for a lithium-ion battery (LIB) cell at high voltage and high temperature.

SUMMARY OF THE INVENTION

Embodiments of the invention generally provide lithium-ion battery materials and methods for producing lithium-ion battery materials thereof. One embodiment of the invention provides an oxide material, such as a lithium cobalt oxide material having a chemical formula of $Li_x Co_y O_z$, wherein x is from 0.9 to 1.1 ($0.9 \le x \le 1.1$), y is from 0.9 to 1.1 ($0.9 \le y \le 1.1$), and z is from 1.8 to 2.2 ($1.8 \le z \le 2.2$). The material can be obtained from a process, which includes forming a mist of a liquid mixture comprising a lithium-containing salt, and a cobalt-containing salt, mixing the mist of the liquid mixture with a gas flow to form a gas-liquid mixture, drying the gas-liquid mixture to form a gas-solid mixture at a drying temperature, separating the gas-solid mixture to obtain one or more solid particles of an oxide material, and annealing the solid particles of the oxide material at an annealing temperature of 400° C. or higher to obtain crystalized particles of the lithium cobalt oxide material.

In one example, the lithium cobalt oxide material, $Li_x Co_y O_z$, is obtained from adjusting a molar ratio $M_{LiSalt}:M_{CoSalt}$ of the lithium-containing salt, and the cobalt-containing salt, in the liquid mixture to be a ratio of about x:y for making the lithium cobalt oxide material at desirable atomic ratio of Li:Co equaling to x:y. For example, the molar ratio $M_{LiSalt}:M_{CoSalt}$ of the lithium-containing salt, and the cobalt-containing salt is performed prior to forming the mist of the liquid mixture. As another example, molar ratio $M_{LiSalt}:M_{CoSalt}$ of the lithium-containing salt, and the cobalt-containing salt can be adjusted at the same time of forming the mist of the liquid mixture.

Another embodiment of the invention provides a lithium cobalt oxide material having a chemical formula of $Li_x Co_y O_z$, where x is from 0.9 to 1.1 ($0.9 \le x \le 1.1$), y is from 0.9 to 1.1 ($0.9 \le y \le 1.1$), and z is from 1.8 to 2.2 ($1.8 \le z \le 2.2$). The lithium cobalt oxide material is obtained from a process, which includes adjusting a molar ratio $M_{LiSalt}:M_{CoSalt}$ of a lithium-containing salt and a cobalt-containing salt to be a ratio of about x:y in a liquid mixture and forming a mist of the liquid mixture, mixing the mist of the liquid mixture with a gas flow to form a gas-liquid mixture, drying the gas-liquid mixture in the presence of a gas flow to form a gas-solid mixture at a drying temperature, separating the gas-solid mixture into one or more solid particles of an oxide material, and annealing the solid particles of the oxide material at an annealing temperature to obtain crystalized particles of the lithium cobalt oxide material.

In yet another embodiment of the invention provides a lithium cobalt oxide material having a chemical formula of $Li_x Co_y O_z$, where x is from 0.9 to 1.1 (0.9<x≤1.1), y is from 0.9 to 1.1 (0.9≤y≤1.1), and z is from 1.8 to 2.2 (1.8≤z≤2.2). The lithium cobalt oxide material is obtained from a process, which includes adjusting a molar ratio $M_{LiSalt}:M_{CoSalt}$ of a lithium-containing salt and a cobalt-containing salt into a liquid mixture and forming a mist of the liquid mixture, mixing the mist of the liquid mixture with a gas flow to form a gas-liquid mixture, drying the gas-liquid mixture in the presence of a gas flow to form a gas-solid mixture at a drying temperature, and annealing the solid particles of the oxide material at an annealing temperature to obtain crystalized particles of the lithium cobalt oxide material.

In still another embodiment, a method of producing a lithium cobalt oxide material having a chemical formula of $Li_x Co_y O_z$ is provided. The method includes adjusting a molar ratio $M_{LiSalt}:M_{CoSalt}$ of a lithium-containing salt and a cobalt-containing salt into a liquid mixture and forming a mist of the liquid mixture, where the liquid mixture comprises the lithium-containing salt, the cobalt-containing salt, and a suitable solvent. The method further includes mixing the mist of the liquid mixture with a gas flow to form a gas-liquid mixture, drying the gas-liquid mixture to form one or more solid particles of an oxide material at a drying temperature of 200° C. or higher, separating the gas-solid mixture into one or more solid particles of an oxide material, and annealing the solid particles of the oxide material at an annealing temperature of 400° C. or higher to obtain crystalized particles of the lithium cobalt oxide material.

BRIEF DESCRIPTION OF THE DRAWING

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

This invention generally relates to compositions, oxide materials, battery materials, apparatuses, and methods thereof in soluble solutions in proper molar ratio to precisely control and obtain proper atomic-level ratios and make-up of a battery active material to be used for a lithium-ion battery. The battery materials and methods and apparatus provided here results in highly pure, accurate stoichiometric phases battery cathode materials and can be used, in turn, to make lithium-ion batteries with, with characteristics associated with high battery cycling performance, including high electric capacity.

Figure 1A:
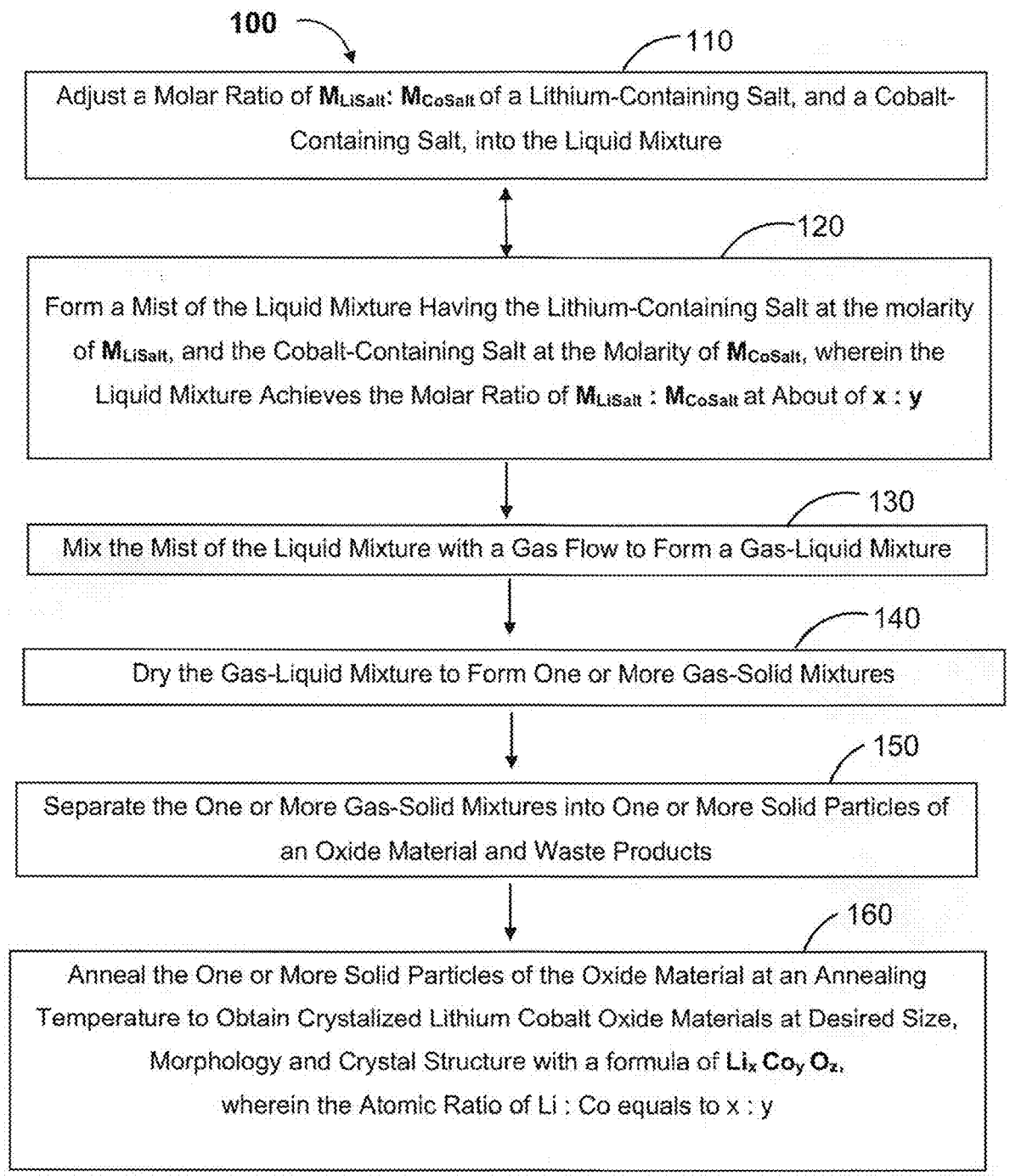
FIG. 1A illustrates one embodiment of a flow chart of a method of producing cathode materials for lithium-ion batteries.

FIG. 1A is a flow chart showing a method 100 of producing lithium cobalt oxide material having a chemical formula of $Li_x Co_y O_z$ for lithium-ion batteries.

The method includes a step 110 or series of steps of adjusting a molar ratio $M_{LiSalt}:M_{CoSalt}$ of a lithium-containing salt (LiSalt), and a cobalt-containing salt (CoSalt), which are soluble in a suitable solvent into a liquid mixture. The molar ratio $M_{LiSalt}:M_{CoSalt}$ of the lithium-containing salt (LiSalt), and the cobalt-containing salt (CoSalt) is adjusted to be a ratio of about x:y for making the lithium cobalt oxide ($Li_x Co_y O_z$) at desirable atomic ratio of Li:Ni equaling to x:y, where x is from 0.9 to 1.1 (0.9≤x≤1.1), y is from 0.9 to 1.1 (0.9≤y≤1.1), z is from 1.8 to 2.2 (1.8≤z≤2.2).

In one embodiment, the desired molar ratio of $M_{LiSalt}:M_{CoSalt}$ can be achieved by measuring and preparing appropriate amounts a lithium-containing salt (LiSalt), and a cobalt-containing salt (CoSalt). For example, the molar ratio $M_{LiSalt}:M_{CoSalt}$ of the lithium-containing salt, and the cobalt-containing salt can be adjusted (e.g., manually or digitally using a processing system of the invention) and prepared directly into a liquid mixture in a desired concentration prior to forming the mist of the liquid mixture.

As another example, the adjusting the molar ratio $M_{LiSalt}:M_{CoSalt}$ of the lithium-containing salt, and the cobalt-containing salt can be performed simultaneously with forming the mist of the liquid mixture.

The method 100 includes further includes a step 120 of forming a liquid mixture having the lithium-containing salt at the molarity of $M_{LiSalt}$, and the cobalt-containing salt at the molarity of $M_{CoSalt}$ for producing lithium cobalt oxide materials with a targeting formula of $Li_x Co_y O_z$, and where the liquid mixture achieves the molar ratio of $M_{LiSalt}:M_{CoSalt}$ at about of x:y.

The mist of the liquid mixture may include droplets of various reactant solution, precursor solutions, etc., in homogenous forms, sizes, shape, etc. For example, the molar ratio $M_{LiSalt}:M_{CoSalt}$ of the lithium-containing salt, and the cobalt-containing salt, can be digitally adjusted, depending on the desired composition of final solid product particles.

In one embodiment of the present invention is that the liquid form of the lithium-containing salt, and the cobalt-containing salt can be dissolved or dispersed in a suitable solvent (e.g., water, alcohol, methanol, isopropyl alcohol, organic solvents, inorganic solvents, organic acids, sulfuric acid ($H_2SO_4$), citric acid ($C_6H_8O_7$), acetic acids ($CH_3COOH$), butyric acid ($C_4H_8O_2$), lactic acid ($C_3H_6O_3$), nitric acid ($HNO_3$), hydrochloric acid (HCl), ethanol, pyridine, ammonia, acetone, and their combinations) to form into a liquid mixture of an aqueous solution, slurry, gel, aerosol or any other suitable liquid forms. For example, one or more solid particles of an oxide material can be adjusted manually or digitally and prepared in desirable molar ratio and mixed into a liquid mixture, such as by adjusting, measuring and preparing appropriate amounts of the lithium-containing salt compound, and the cobalt-containing salt compound into one solution with suitable amounts of a solvent. Depending on the solubility of the lithium-containing salt, and the cobalt-containing salt in a chosen solvent, pH, temperature, and mechanical stirring and mixing can be adjusted to obtain a liquid mixture, where the one or more metal-containing salts at the desirable molar concentrations are fully dissolved and/or evenly dispersed.

In another embodiment, the lithium containing salts are mixed into the liquid mixture. Exemplary lithium containing salts include, but not limited to, lithium sulfate ($Li_2SO_4$), lithium nitrate ($LiNO_3$), lithium carbonate ($Li_2CO_3$), lithium acetate ($LiCH_2COO$), lithium hydroxide (LiOH), lithium formate ($LiCHO_2$), lithium chloride (LiCl), and combinations thereof. The cobalt containing salts are mixed into the liquid mixture. Exemplary cobalt containing salts include, but not limited to, cobalt sulfate ($CoSO_4$), cobalt nitrate ($Co(NO_3)_2$), cobalt acetate ($Co(CH_2COO)_2$), cobalt formate ($Co(CHO_2)_2$), cobalt chloride ($CoCl_2$), and combinations thereof.

Not wishing to be bound by theory, it is contemplated that, all the required metal-containing salts are first prepared in liquid phase (e.g., into a solution, slurry, or gel-like mixtures) using the lithium-containing salt, and the cobalt-containing salt as the sources of each metal element such that the different metals can be mixed uniformly at desired ratio. As an example, to prepare a liquid mixture of an aqueous solution, slurry or gel, with high water solubility can be used. For example, metal nitrate, metal sulfate, metal chloride, metal acetate, and metal format, etc., can be used. Organic solvents, such as alcohols, isopropanol, etc., can be used to dissolve and/or disperse metal-containing salt compounds with low water solubility. In some cases, the pH value of the liquid mixture can be adjusted to increase the solubility of the one or more precursor compounds. Optionally, chemical additives, gelation agents, and surfactants, such as ammonia, EDTA, etc., can be added into the liquid mixture to help dissolve or disperse the compounds in a chosen solvent.

At step 130, the mist of the liquid mixture is mixed with a gas flow of a gas inside a mist generator to form a gas-liquid mixture. In addition, the liquid mixture is mixed with a gas flow of another gas inside a drying chamber. It is contemplated that these gas flows are provided to thoroughly mix the liquid mixture to uniformly form into the gas-liquid mixture and assist in carrying the gas-liquid mixture inside the drying chamber. The method 100 further includes a step 140 of drying the gas-liquid mixture at a drying temperature in the presence of the gas flows for a time period to obtain gas-solid mixtures.

The gases within the gas flows may be, for example, air, oxygen, carbon dioxide, nitrogen gas, hydrogen gas, inert gas, noble gas, and combinations thereof, among others. The gas flows may be pumped through an air filter to remove any particles, droplets, or contaminants, and the flow rate of the gases can be adjusted by a valve or other means. Accordingly, one embodiment of the invention provides that the gases are used as the gas source for carrying out drying reaction, evaporation, dehydration, and/or other reactions. In another embodiment, the gases are heated to a drying temperature to mix with the mist and remove moisture from the mist.

The drying temperature can be, for example, about 200° C. or higher, such as from 200° C. to 300° C., or at 250° C. The time period is around 1 second to 1 hour. Optionally, additional gas flow may be used to perform the drying reaction. The additional gas may be, for example, air, oxygen, carbon dioxide, nitrogen gas, hydrogen gas, inert gas, noble gas, and combinations thereof, among others. The additional gas flow may be pumped through an air filter to remove any particles, droplets, or contaminants, and the flow rate of the additional gas can be adjusted by a valve or other means.

Next, at step 150, step 150 includes separating the gas-solid mixture into one or more solid particles of an oxide material and waste products. The gas-solid mixture comprising of the gas and the compounds mixed together are separated into one or more solid particles of oxide materials and waste products. The one or more solid particles of the oxide material may include thoroughly mixed solid particles of the compounds. Accordingly, the step 150 of the method 100 of preparing a battery material includes obtaining one or more solid particles of the oxide material from a gas-solid mixture comprised of a gas and one or more compounds.

The method 100 further includes a step 160 of annealing the one or more solid particles of an oxide material at an annealing temperature for a time period to obtain crystalized lithium cobalt oxide materials of desired size, morphology and crystal structure with a formula of $Li_x Co_y O_z$, wherein the atomic ratio of Li:Co equaling to x:y. The annealing temperature is from 400° C. to 1200° C., for example, more than 900° C., such as 1050° C. The time period is about 1 second to 10 hours.

Figure 1B:
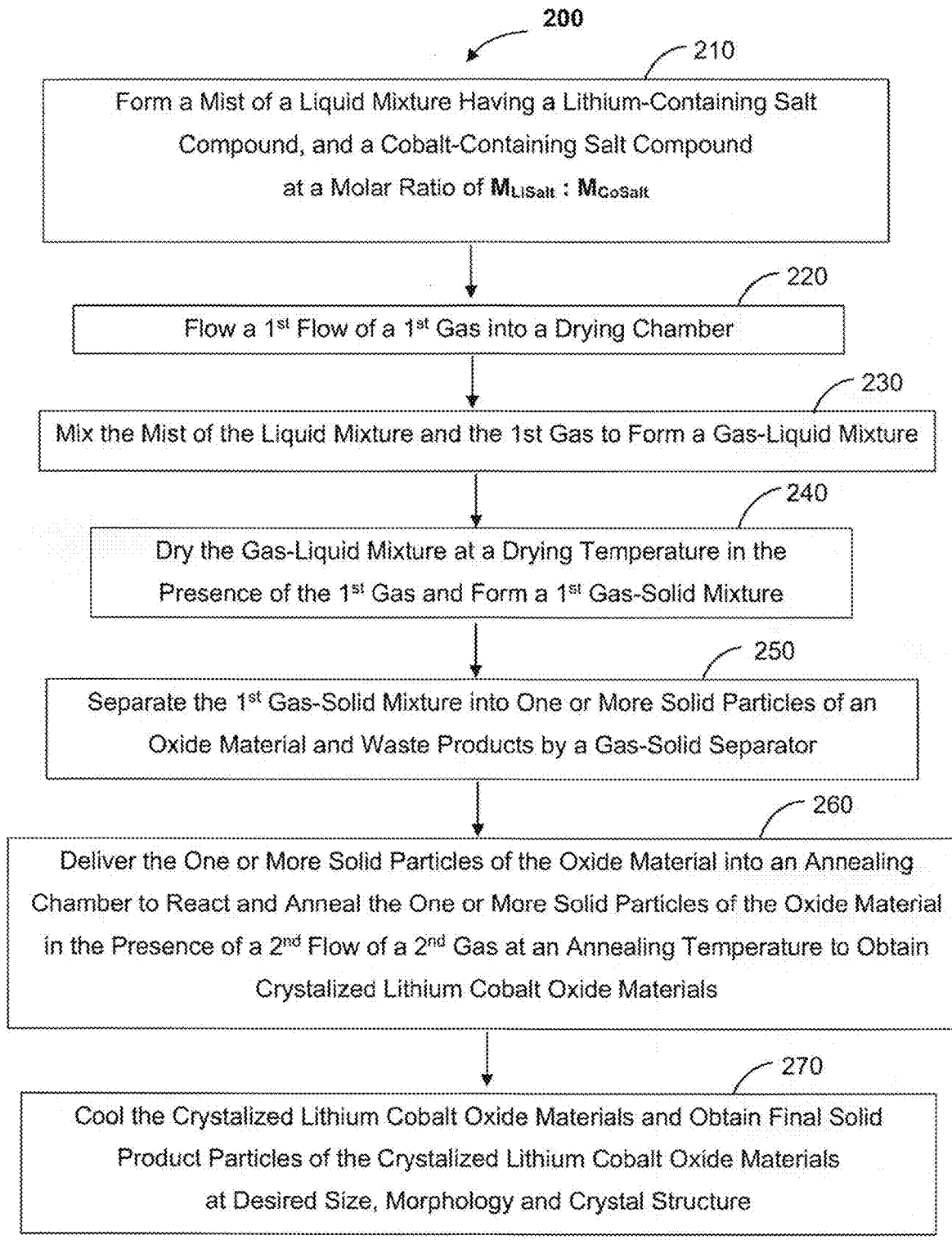
FIG. 1B illustrates another embodiment of another flow chart of a method of producing cathode materials for lithium-ion batteries.

FIG. 1B illustrates another embodiment of a flow chart of a method 200 of producing a lithium cobalt oxide material for lithium-ion batteries. The method 200 comprises a first step 210 of forming a mist of a liquid mixture having a lithium-containing salt compound, a cobalt-containing salt compound of $M_{LiSalt}:M_{CoSalt}$. The molar ratio $M_{LiSalt}:M_{CoSalt}$ is adjusted to be a ratio of about x:y for making the lithium cobalt oxide ($Li_x Co_y O_z$) at desirable atomic ratio of Li:Co: equaling to x:y, where x is from 0.9 to 1.1 ($0.9 \le x \le 1.1$), y is from 0.9 to 1.1 ($0.9 \le y \le 1.1$), z is from 1.8 to 2.2 ($1.8 \le z \le 2.2$).

In one embodiment, the desired molar ratio of $M_{LiSalt}:M_{CoSalt}$ can be achieved by measuring and preparing appropriate amounts a lithium-containing salt (LiSalt), and a cobalt-containing salt (CoSalt). For example, the molar ratio $M_{LiSalt}:M_{CoSalt}$ of the lithium-containing salt, and the cobalt-containing salt can be adjusted (e.g., manually or digitally using a processing system of the invention) and prepared directly into a liquid mixture in a desired concentration prior to forming the mist of the liquid mixture. As another example, the adjusting the molar ratio $M_{LiSalt}:M_{CoSalt}$ of the lithium-containing salt, and the cobalt-containing salt can be performed simultaneously with forming the mist of the liquid mixture.

In one embodiment, liquid form of lithium-containing salt compound, and cobalt-containing salt compound can be adjusted and prepared directly into a liquid mixture in a desired concentration. The liquid form of the lithium-containing salt compound, and the cobalt-containing salt compound can be dissolved or dispersed in a suitable solvent (e.g., water, alcohol, methanol, isopropyl alcohol, organic solvents, inorganic solvents, organic acids, sulfuric acid ($H_2SO_4$), citric acid ($C_6H_8O_7$), acetic acids ($CH_3COOH$), butyric acid ($C_4H_8O_2$), lactic acid ($C_3H_6O_3$), Nitric acid ($HNO_3$), hydrochloric acid (HCl), ethanol, pyridine, ammonia, acetone, and their combinations) to form into a liquid mixture of an aqueous solution, slurry, gel, aerosol or any other suitable liquid forms.

In another embodiment, the lithium-containing salt, and the cobalt-containing salt can be used, depending on the desired composition of final solid product particles. For example, one or more solid particles of an oxide material can be digitally adjusted and prepared in desirable molar ratio and mixed into a liquid mixture, such as by digitally adjusting, measuring and preparing appropriate amounts of the lithium-containing salt, and the cobalt-containing salt into a container with suitable amounts of a solvent. Depending on the solubility of the lithium-containing salt, and the cobalt-containing salt in a chosen solvent, pH, temperature, and mechanical stirring and mixing can be adjusted to obtain a liquid mixture, where the one or more metal-containing salts at the desirable molar concentrations are fully dissolved and/or evenly dispersed.

In yet another embodiment, the lithium-containing salt, and the cobalt-containing salt are mixed into a liquid mixture for obtaining final solid product particles of a mixed metal oxide material.

For example, the lithium containing salts and the cobalt containing salts are mixed into the liquid mixture. Exemplary lithium containing salts include, but not limited to, lithium sulfate ($Li_2SO_4$), lithium nitrate ($LiNO_3$), lithium carbonate ($Li_2CO_3$), lithium acetate ($LiCH_2COO$), lithium hydroxide (LiOH), lithium formate ($LiCHO_2$), lithium chloride (LiCl), and combinations thereof. Exemplary cobalt containing salts include, but not limited to, cobalt sulfate ($CoSO_4$), cobalt nitrate ($Co(NO_3)_2$), cobalt acetate ($Co(CH_2COO)_2$), cobalt formate ($Co(CHO_2)_2$), cobalt chloride ($CoCl_2$), and combinations thereof.

Not wishing to be bound by theory, it is contemplated that, all of the required metal elements are first mixed in liquid phase (e.g., into a solution, slurry, or gel) using metal-containing salts as the sources of each metal element such that the different metals can be mixed uniformly at desired ratio. For example, metal nitrate, metal sulfate, metal chloride, metal acetate, and metal format, etc., can be used. Organic solvents, such as alcohols, isopropanol, etc., can be used to dissolve and/or disperse metal-containing salt with low water solubility. In some cases, the pH value of the liquid mixture can be adjusted to increase the solubility of the one or more precursor compounds. Optionally, chemical additives, gelation agents, and surfactants, such as ammonia, EDTA, etc., can be added into the liquid mixture to help dissolve or disperse the compounds in a chosen solvent.

Secondly, at step 220 of the method 200, the method includes flowing a flow of a gas into a drying chamber. The flow of the gas may be pumped through an air filter to remove any particles, droplets, or contaminants, and the flow rate of the gas can be adjusted by a valve or other means. In one embodiment, the gas is heated to a drying temperature to mix with the mist and remove moisture from the mist.

The mist of the liquid mixture may be generated by a mist generator, such as a nozzle, a sprayer, an atomizer, or any other mist generators. Most mist generators employ air pressure or other means to covert a liquid mixture into liquid droplets. The mist generator can be coupled to a portion of the drying chamber to generate a mist (e.g., a large collection of small size droplets) of the liquid mixture directly within the drying chamber. As an example, an atomizer can be attached to a portion of the drying chamber to spray or inject the liquid mixture into a mist containing small sized droplets directly inside the drying chamber. In general, a mist generator that generates a mist of mono-sized droplets are desirable. Alternatively, a mist can be generated outside the drying chamber and delivered into the drying chamber.

Desired liquid droplet sizes can be adjusted by adjusting the sizes of liquid delivery/injection channels within the mist generator. Droplet size ranging from a few nanometers to a few hundreds of micrometers can be generated. Suitable droplet sizes can be adjusted according to the choice of the mist generator used, the precursor compounds, the temperature of the drying chamber, the flow rate of the gas, and the residence time inside the drying chamber. As an example, a mist with liquid droplet sizes between one tenth of a micron and one millimeter is generated inside the drying chamber.

Then, at step 230 of the method 200, a mist of the liquid mixture is mixed with the flow of a gas to form a gas-liquid mixture prior to and/or after the liquid mixture is inside the drying chamber. The mist is formed from a liquid mixture dissolved and/or dispersed in a suitable liquid solvent. The flow of one or more gases and the flow of the mist are mixed together to form a gas-liquid mixture. The gases may be, for example, air, oxygen, carbon dioxide, nitrogen gas, hydrogen gas, inert gas, noble gas, and combinations thereof, among others. The gases may be pumped through an air filter to remove any particles, droplets, or contaminants, and the flow rate of the gases can be adjusted by a valve or other means.

In one example, the mist of the liquid mixture is mixed with a flow of a carrying gas inside the mist generator prior to delivering into the drying chamber. In another example, the mist of the liquid mixture is mixed with a flow of a drying gas inside the drying chamber and carrying through the drying chamber to be dried. Accordingly, one embodiment of the invention provides that one or more gases flown within the drying chamber are used as the gas source for carrying out drying reaction, evaporation, dehydration, and/or other reactions inside the drying chamber such that gas-liquid mixtures are dried into gas-solid mixtures. In another embodiment, the gases is heated to a drying temperature to mix with the mist and remove moisture from the mist.

At step 240, drying the gas-liquid mixture at a drying temperature in the presence of the gas and forming a gas-solid mixture is performed. The mist of the liquid mixture is dried (e.g., removing its moisture, liquid, etc.) at a drying temperature for a desired residence time and form into a gas-solid mixture with the flow of the gases within the drying chamber. As the removal of the moisture from the mist of the liquid mixture is performed within the drying chamber filled with the gases, a gas-solid mixture comprising of the gases and the compounds is formed. Accordingly, one embodiment of the invention provides that the gases flown within the drying chamber are used as the gas source for forming a gas-solid mixture within the drying chamber. To illustrate, the liquid mixture is dried inside the drying chamber and the drying temperature inside the drying chamber is maintained via a heating element coupled to the drying chamber, where the heating element can be a suitable heating mechanism, such as wall-heated furnace, electricity powered heater, fuel-burning heater, etc.

In another embodiment, the gases flown within the drying chamber is heated and the thermal energy of the heated gas is served as the energy source for carrying out drying reaction, evaporation, dehydration, and/or other reactions inside the drying chamber. The gas can be heated to a drying temperature by passing through a suitable heating mechanism, such as electricity powered heater, fuel-burning heater, etc. The drying temperature is about 200° C. or higher, for example, from 200° C. to 300° C., such as 250° C. For instance, the liquid mixture is dried in the presence of the gas that is heated to 200° C. or higher inside the drying chamber and the gas is delivered into the drying chamber to maintain the drying temperature inside the drying chamber.

In one configuration, the gas is pre-heated to a drying temperature of about 200° C. or higher prior to flowing into the drying chamber. In another configuration, drying the mist can be carried out by heating the drying chamber directly, such as heating the chamber body of the drying chamber. For example, the drying chamber can be a wall-heated furnace to maintain the drying temperature within internal plenum of the drying chamber. The advantages of using heated gas are fast heat transfer, high temperature uniformity, and easy to scale up, among others. The drying chambers may be any chambers, furnaces with enclosed chamber body, such as a dome type ceramic drying chamber, a quartz chamber, a tube chamber, etc. Optionally, the chamber body is made of thermal insulation materials (e.g., ceramics, etc.) to prevent heat loss during drying.

The gases may be, for example, air, oxygen, carbon dioxide, nitrogen gas, hydrogen gas, inert gas, noble gas, and combinations thereof, among others. For example, heated air can be used as an inexpensive gas source and energy source for drying the mist. The choice of the gases may be a gas that mix well with the mist of the liquid mixture and dry the mist without reacting to the compounds. In some cases, the chemicals in the droplets/mist may react to the gases and/or to each other to certain extent during drying, depending on the drying temperature and the chemical composition of the compounds. In addition, the residence time of the mist of thoroughly mixed compounds within the drying chamber is adjustable and may be, for example, between one second and one hour, depending on the flow rate of the gases, and the length and volume of the path that the mist has to flow through within the drying chamber.

The gas-liquid mixture is being dried within the drying chamber using the heated gases flow continuously and/or at adjustable, variable flow rates. At the same time, dried solid particles of compounds are carried by the gases, as a thoroughly-mixed gas-solid mixture, through a path within the drying chamber, and as more gases is flown in, the gas-solid mixture is delivered out of the drying chamber and continuously delivered to a gas-solid separator connected to the drying chamber.

Not wishing to be bound by theory, in the method 200 of manufacturing a battery material using the lithium-containing salt, and the cobalt-containing salt, it is contemplated that the lithium-containing salt, and the cobalt-containing salt are prepared into a liquid mixture and then converted into droplets, each droplet will have the one or more liquid mixture uniformly distributed. Then, the moisture of the liquid mixture is removed by passing the droplets through the drying chamber and the flow of the gas is used to carry the mist within the drying chamber for a suitable residence time. It is further contemplated that the concentrations of the compounds in a liquid mixture and the droplet sizes of the mist of the liquid mixture can be adjusted to control the chemical composition, particle sizes, and size distribution of final solid product particles of the battery material. It is designed to obtain spherical solid particles from a thoroughly mixed liquid mixture of two or more precursors after drying the mist of the liquid mixture. In contrast, conventional solid-state manufacturing processes involve mixing or milling a solid mixture of precursor compounds, resulting in uneven mixing of precursors.

Next, at step 250, step 250 includes separating the gas-solid mixture into one or more solid particles of an oxide material and waste products by a gas-solid separator. The gas-solid mixture comprising of the gas and the compounds mixed together are separated into one or more solid particles of an oxide material and a waste product. The one or more solid particles of an oxide material may include thoroughly mixed solid particles of the compounds. Accordingly, the step 250 of the method 200 of preparing a battery material includes obtaining one or more solid particles of an oxide material from a gas-solid mixture comprised of a gas and one or more compounds.

In the method 200 of preparing final solid product particles of the battery material in multiple stages, it is contemplated to perform one or more reactions of the compounds in a drying stage, two or more reaction stages, one or more cooling stages, etc., in order to obtain final solid product particles of the crystalized lithium cobalt oxide materials at desired size, morphology and crystal structure, which are ready for further battery applications. Not wishing to be bound by theory, it is designed to perform the reaction of the compounds in two or more reaction stages to allow sufficient time and contact of the compounds to each other, encourage nucleation of proper crystal structure and proper folding of particle morphology, incur lower-thermodynamic energy partial reaction pathways, ensure thorough reactions of all compounds, and finalize complete reactions, among others.

The one or more solid particles of a lithium cobalt oxide material comprising the compounds are then processed in two or more processing stages using at least a reaction module designed for initiating reactions, and one or more reaction modules designed for completing reactions and obtaining final solid product particles of the crystalized lithium cobalt oxide materials. Additional reaction modules can also be used. In one embodiment, the reaction module includes one anneal reaction to react and oxidize the one or more solid particles of a lithium cobalt oxide material into an oxidized reaction product, where a portion of them are partially reacted (some complete reactions may occur). The another reaction module includes annealing the oxidized reaction product into final solid product particles of the crystalized lithium cobalt oxide materials to ensure complete reactions of all the reaction products.

Accordingly, the method 200 may include a processing stage of drying a mist of a liquid mixture and obtaining one or more solid particles of an oxide material using a processing module comprised of a drying chamber and a gas-solid separator. The method 200 may further include another processing stage of reacting, oxidizing and annealing the f one or more solid particles of an oxide material using a reaction module comprised of an annealing chamber.

At step 260, step 260 includes delivering the solid particles of the oxide material into an annealing chamber to react and anneal the solid particles of the oxide material in the presence of a flow of a gas at an annealing temperature to obtain crystalized lithium cobalt oxide materials.

The one or more solid particles of an oxide material is delivered into an annealing chamber once the one or more solid particles of an oxide material are separated from the waste product. The one or more solid particles of the oxide material is reacted and oxidized in the presence of a gas within the annealing chamber to form an oxidized reaction product. Reactions of the one or more solid particles of the oxide material within the annealing chamber may include any of oxidation, reduction, decomposition, combination reaction, phase-transformation, re-crystallization, single displacement reaction, double displacement reaction, combustion, isomerization, and combinations thereof. For example, the one or more solid particles of the oxide material may be oxidized, such as oxidizing the precursor compounds into an oxide material.

Exemplary gases include, but not limited to air, oxygen, carbon dioxide, an oxidizing gas, nitrogen gas, inert gas, noble gas, and combinations thereof. For an oxidation reaction inside the annealing chamber, such as forming an oxide material from one or more precursors, an oxidizing gas can be used as the gas for annealing. Accordingly, one embodiment of the invention provides that the gas flows within the annealing chamber is used to oxidize the one or more solid particles of the oxide material. The gases, for example, can be air or oxygen and combination thereof. If desired, the gases can be oxygen with high purity; the purity of the oxygen is more than 50%, for example more than 80%, such as 95%. Accordingly, the gas flows within the annealing chamber is served as the energy source for carrying out reaction, oxidation, and/or other reactions inside the annealing chamber.

At this stage of the process, the step 260 further includes delivering the solid particles of the oxide material into an annealing chamber to react and annealing the solid particles of the lithium cobalt oxide material in the presence of a flow of a gas at an annealing temperature of 400° C. or higher for a residence time to obtain crystalized lithium cobalt oxide materials. For example, the annealing temperature can be more than 900° C., such as 1050° C., such as 1000° C. The residence time is about 1 second to 10 hours.

In one embodiment, the gas flown within the annealing chamber is heated and the thermal energy of the heated gas is served as the energy source for carrying out annealing reaction, and/or other reactions inside the annealing chamber. The gas can be heated to a temperature of 550° C. or higher by passing through a suitable heating mechanism, such as electricity powered heater, fuel-burning heater, etc. For instance, the one or more solid particles of the oxide materials are annealed in the presence of the gas that is heated to 550° C. or higher inside the annealing chamber and the gas is delivered into the annealing chamber to maintain the annealing temperature inside the annealing chamber.

Another embodiment of the present invention is that the one or more solid particles of the oxide materials are annealed inside the annealing chamber and the annealing temperature inside the annealing chamber is maintained via a heating element coupled to the annealing chamber, where the heating element can be a suitable heating mechanism, such as wall-heated furnace, electricity powered heater, fuel-burning heater, etc.

In one configuration, the gas is pre-heated to a temperature of about 550° C. or higher prior to flowing into the annealing chamber. In another configuration, annealing the one or more solid particles of the oxide materials can be carried out by heating the annealing chamber directly, such as heating the chamber body of the annealing chamber. For example, the annealing chamber can be a wall-heated furnace to maintain the annealing temperature within internal plenum of the annealing chamber. The advantages of using heated gas are fast heat transfer, high temperature uniformity, and easy to scale up, among others. The annealing chambers may be any chambers, furnaces with enclosed chamber body, such as a dome type ceramic annealing chamber, a quartz chamber, a tube chamber, etc. Optionally, the chamber body of the annealing chamber is made of thermal insulation materials (e.g., ceramics, etc.) to prevent heat loss during annealing process.

The gas may be, for example, air, oxygen, carbon dioxide, nitrogen gas, hydrogen gas, inert gas, noble gas, and combinations thereof, among others. For example, heated air can be used as an inexpensive gas source and energy source for drying the mist. In addition, the residence time within the annealing chamber is adjustable and may be, for example, between one second and one hour, depending on the flow rate of the gas, and the length and volume of the path that the solid particles have to pass through within the annealing chamber.

The method 200 may include a processing stage of cooling the crystalized lithium cobalt oxide materials and obtaining final solid product particles of the crystalized lithium cobalt oxide materials at desired size, morphology and crystal structure at step 270. For example, the temperature of the final solid product particles of the crystalized lithium cobalt oxide materials may be slowly cooled down to room temperature to avoid interfering or destroying a process of forming into its stable energy state with uniform morphology and desired crystal structure. In another example, the cooling stage may be performed very quickly to quench the reaction product such the crystal structure of the solid particles of the reaction product can be formed at its stable energy state. As another example, a cooling processing stage in a multi-stage continuous process may include a cooling module comprised of one or more cooling mechanisms. Exemplary cooling mechanisms may be, for example, a gas-solid separator, a heat exchanger, a gas-solid feeder, a fluidized bed cooling mechanism, and combinations thereof, among others.

Figure 2:
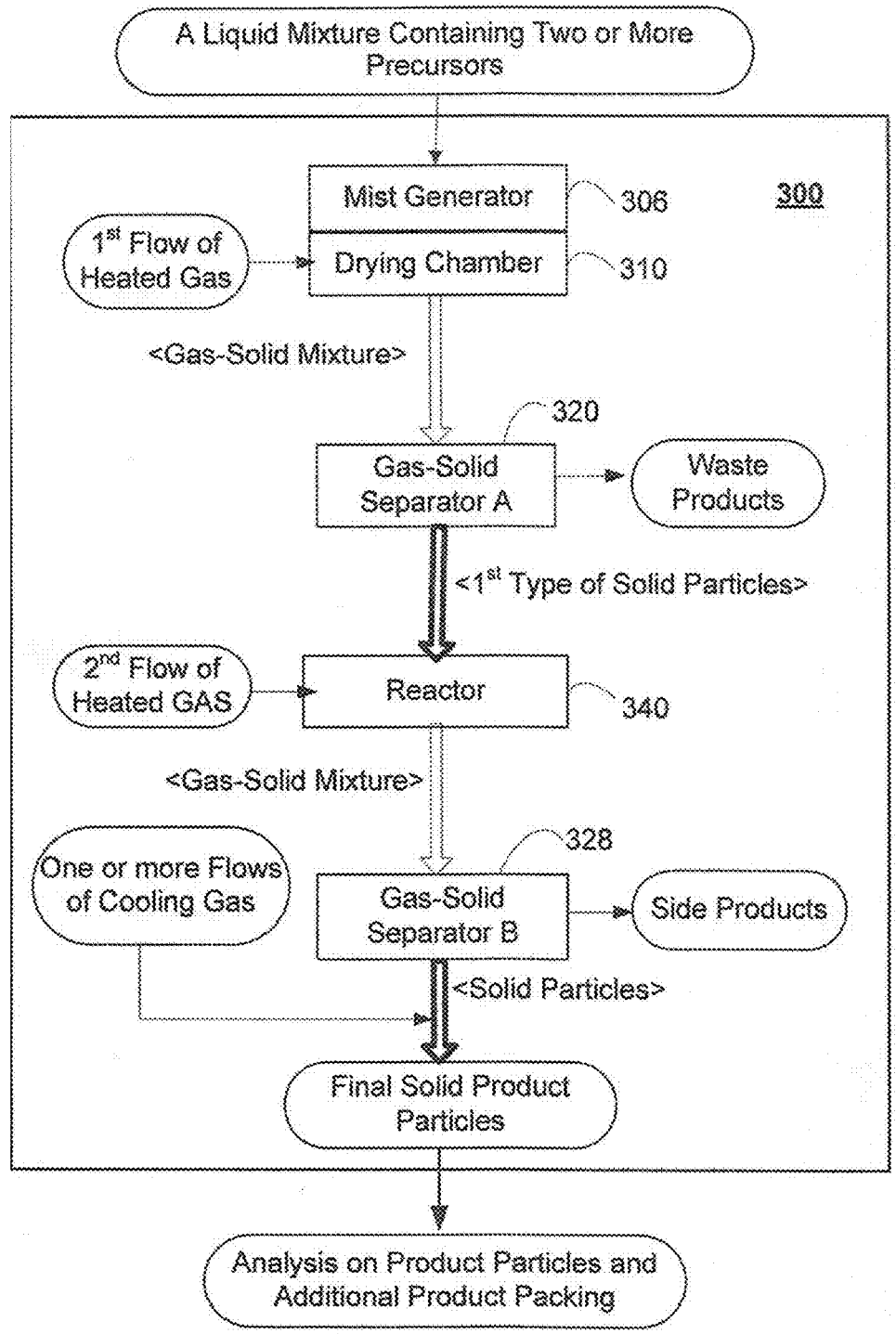
FIG. 2 is a schematic of an exemplary processing system useful in preparing a material for a battery electrochemical cell according one embodiment of the invention.

FIG. 2 illustrates a flow chart of incorporating the method 100 of preparing a material for a battery electrochemical cell using a system 300 fully equipped with all of the required manufacturing tools. The system 300 generally includes a mist generator 306, a drying chamber 310, a gas-solid separator 320, and a reactor 340. First, a liquid mixture containing two or more precursors is prepared and delivered into the mist generator 306 of the system 300. The mist generator 306 is coupled to the drying chamber 310 and adapted to generate a mist from the liquid mixture. A flow of heated gas can be flowed into the drying chamber 310 to fill and pre-heat an internal volume of the drying chamber 310 prior to the formation of the mist or at the same time when the mist is generated inside the drying chamber 310. The mist is mixed with the heated gas and its moisture is removed such that a gas-solid mixture, which contains the heated gas, two or more precursors, and/or other gas-phase waste product or by-products, etc., is formed.

Next, the gas-solid mixture is continuously delivered into the gas-solid separator 320 which separates the gas-solid mixture into solid particles and waste products. The solid particles is then delivered into the reactor 340 to be mixed with a flow of heated gas and form a gas-solid mixture. The reaction inside the reactor is carried out for a reaction time until reaction products can be obtained. Optionally, the reaction product gas-solid mixture can be delivered into a gas-solid separator (e.g., a gas-solid separator 328) to separate and obtain final solid product particles and a gaseous side product. In addition, one or more flows of cooling fluids (e.g., gases or liquids) may be used to cool the temperature of the reaction products. The final solid product particles can be delivered out of the system 300 for further analysis on their properties (e.g., specific capacity, power performance, battery charging cycle performance, etc.), particle sizes, morphology, crystal structure, etc., to be used as a material in a battery cell. Finally, the final particles are packed into a component of a battery cell.

Figure 3:
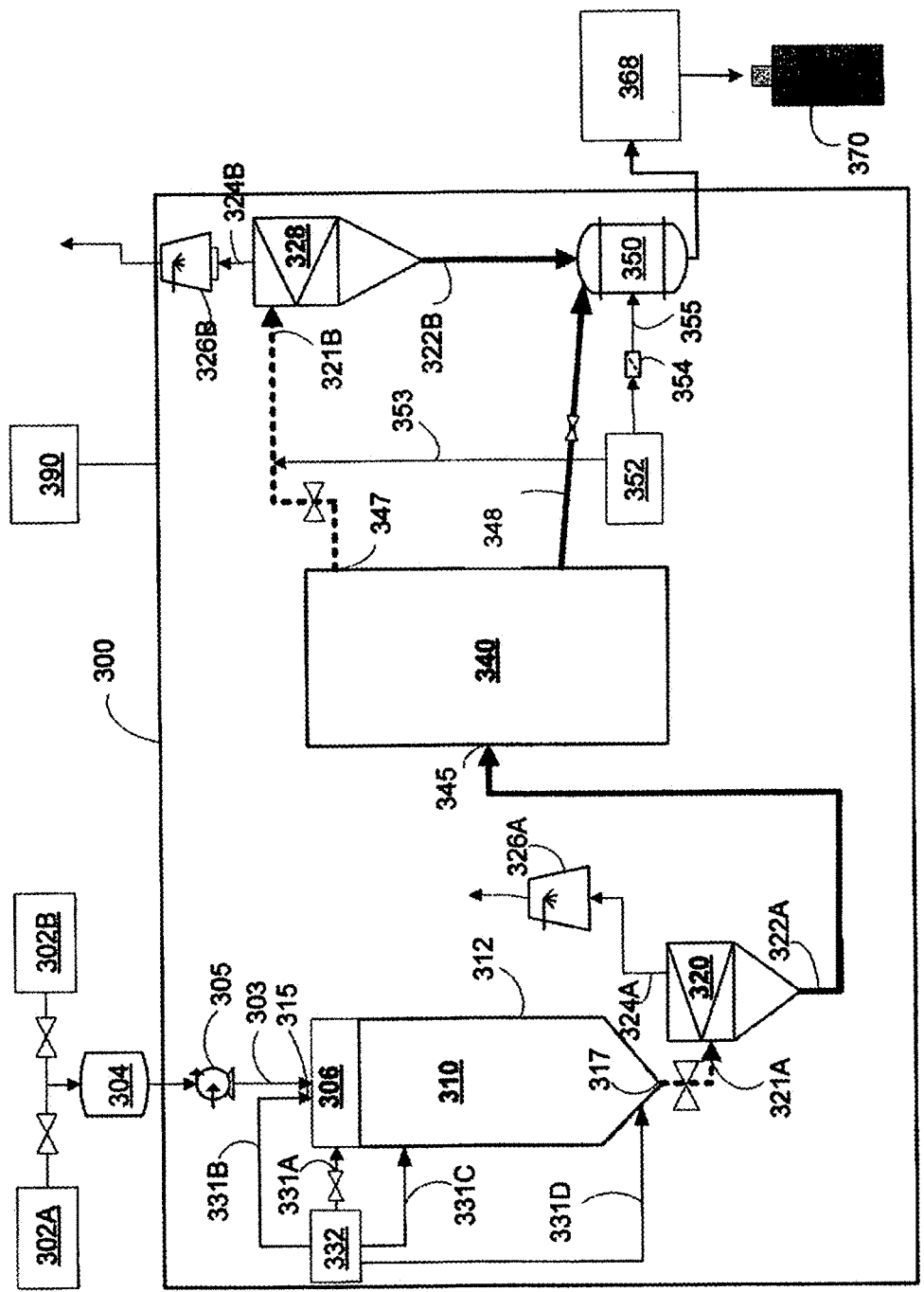
FIG. 3 is a schematic of another exemplary processing system useful in preparing a material for a battery electrochemical cell according one embodiment of the invention.

FIG. 3 is a schematic of the system 300, which is one example of an integrated tool/apparatus that can be used to carry out a fast, simple, continuous and low cost manufacturing process for preparing a material for a battery electrochemical cell. The system 300 is connected to a liquid mixer 304, which in turn is connected to two or more reactant sources 302A, 302B. The reactant sources 302A, 302B are provided to store various precursor compounds and liquid solvents. Desired amounts of precursor compounds (in solid or liquid form) and solvents are dosed and delivered from the reactant sources 302A, 302B to the liquid mixer 304 so that the precursor compounds can be dissolved and/or dispersed in the solvent and mix well into a liquid mixture. If necessary, the liquid mixer 304 is heated to a temperature, such as between 30° C. and 90° C. to help uniformly dissolve, disperse, and/or mix the precursors. The liquid mixer 304 is optionally connected to a pump 305, which pumps the liquid mixture from the liquid mixer 304 into the mist generator 306 of the system 300 to generate a mist.

The mist generator 306 converts the liquid mixture into a mist with desired droplet size and size distribution. In addition, the mist generator 306 is coupled to the drying chamber 310 in order to dry and remove moisture from the mist and obtain thoroughly-mixed solid precursor particles. In one embodiment, the mist generator 306 is positioned near the top of the drying chamber 310 that is positioned vertically (e.g., a dome-type drying chamber, etc.) to inject the mist into the drying chamber 310 and pass through the drying chamber vertically downward. Alternatively, the mist generator can be positioned near the bottom of the drying chamber 310 that is vertically positioned to inject the mist upward into the drying chamber to increase the residence time of the mist generated therein. In another embodiment, when the drying chamber 310 is positioned horizontally (e.g., a tube drying chamber, etc.) and the mist generator 306 is positioned near one end of the drying chamber 310 such that a flow of the mist, being delivered from the one end through another end of the drying chamber 310, can pass through a path within the drying chamber 310 for the length of its residence time.

The drying chamber 310 generally includes a chamber inlet 315, a chamber body 312, and a chamber outlet 317. In one configuration, the mist generator 306 is positioned inside the drying chamber 310 near the chamber inlet 315 and connected to a liquid line 303 adapted to flow the liquid mixture therein from the liquid mixer 304. For example, the liquid mixture within the liquid mixer 304 can be pumped by the pump 305 through the liquid line 303 connected to the chamber inlet 315 into the internal volume of the drying chamber 310. Pumping of the liquid mixture by the pump 305 can be configured, for example, continuously at a desired delivery rate (e.g., adjusted by a metered valve or other means) to achieve good process throughput of system 300. In another configuration, the mist generator 306 is positioned outside the drying chamber 310 and the mist generated therefrom is delivered to the drying chamber 310 via the chamber inlet 315.

One or more gas lines (e.g., gas lines 331A, 331B, 331C, 331D, etc.) can be coupled to various portions of the drying chamber 310 and adapted to flow a gas from a gas source 332 into the drying chamber 310. A flow of the gas stored in the gas source 332 can be delivered, concurrently with the formation of the mist inside drying chamber 310, into the drying chamber 310 to carry the mist through the drying chamber 310, remove moisture from the mist, and form a gas-solid mixture containing the precursors. Also, the flow of the gas can be delivered into the drying chamber 310 prior to the formation of the mist to fill and preheat an internal volume of the drying chamber 310 prior to generating the mist inside the drying chamber 310.

In one example, the gas line 331A is connected to the top portion of the drying chamber 310 to deliver the gas into the mist generator 306 positioned near the chamber inlet 315 to be mixed with the mist generated by the mist generator 306 inside the drying chamber 310. In one embodiment, the gas is preheated to a temperature of between 70° C. and 600° C. to mix with and remove moisture from the mist. As another example, the gas line 331B delivering the gas therein is connected to the chamber inlet 315 of the drying chamber 310, in close proximity with the liquid line 303 having the liquid mixture therein. Accordingly, the gas can thoroughly mix with the mist of the liquid mixture inside the drying chamber 310.

In another example, the gas line 331C is connected to the chamber body 312 of the drying chamber 310 to deliver the gas therein and mix the gas with the mist generated from the mist generator 306. In addition, the gas line 331D connected to the drying chamber 310 near the chamber outlet 317 may be used to ensure the gas-solid mixture formed within the drying chamber 310 is uniformly mixed with the gas.

The flow of the gas may be pumped through an air filter to remove any particles, droplets, or contaminants, and the flow rate of the gas can be adjusted by a valve or other means. In one embodiment, the gas is heated to a drying temperature to mix with the mist and remove moisture from the mist. It is designed to obtain spherical solid particles from a thoroughly-mixed liquid mixture of two or more precursors after drying the mist of the liquid mixture. In contrast, conventional solid-state manufacturing processes involve mixing or milling a solid mixture of precursor compounds, resulting in uneven mixing of precursors.

Once the mist of the liquid mixture is dried and formed into a gas-solid mixture with the gas, the gas-solid mixture is delivered out of the drying chamber 310 via the chamber outlet 317. The drying chamber 310 is coupled to the gas-solid separator 320 of the system 300. The gas-solid separator 320 collects chamber products (e.g., a gas-solid mixture having the gas and the one or more solid particles of a lithium cobalt oxide material mixed together) from the chamber outlet 317.

The gas-solid separator 320 includes a separator inlet 321A, two or more separator outlets 322A, 324A. The separator inlet 321A is connected to the chamber outlet 317 and adapted to collect the gas-solid mixture and other chamber products from the drying chamber 310. The gas-solid separator 320 separates the gas-solid mixture from the drying chamber 310 into one or more solid particles of a lithium cobalt oxide material and waste products. The separator outlet 322A is adapted to deliver the one or more solid particles of a lithium cobalt oxide material to the reactor 340 for further processing and reactions. The separator outlet 324A is adapted to deliver waste products out of the gas-solid separator 320.

The waste products may be delivered into a gas abatement device 326A to be treated and released out of the system 300. The waste product may include, for example, water ($H_2O$) vapor, organic solvent vapor, nitrogen-containing gas, oxygen-containing gas, $O_2$, $O_3$, nitrogen gas ($N_2$), NO, $NO_2$, $NO_2$, $N_2O$, $N_4O$, $NO_3$, $N_2O_3$, $N_2O_4$, $N_2O_5$, $N(NO_2)_3$, carbon-containing gas, carbon dioxide ($CO_2$), CO, hydrogen-containing gas, $H_2$, chlorine-containing gas, $Cl_2$, sulfur-containing gas, $SO_2$, small particles of the one or more solid particles of a lithium cobalt oxide material, and combinations thereof.

The one or more solid particles of a lithium cobalt oxide material may include at least particles of the two or more precursors that are dried and uniformly mixed together. It is contemplated to separate the one or more solid particles of a lithium cobalt oxide material away from any side products, gaseous products or waste products, prior to reacting the two or more precursors in the reactor 340. Accordingly, the system 300 is designed to mix the two or more precursors uniformly, dry the two or more precursors, separate the dried two or more precursors, and react the two or more precursors into final solid product particles of the crystalized lithium cobalt oxide materials in a continuous manner.

Suitable gas-solid separators include cyclones, electrostatic separators, electrostatic precipitators, gravity separators, inertia separators, membrane separators, fluidized beds, classifiers, electric sieves, impactors, particles collectors, leaching separators, elutriators, air classifiers, leaching classifiers, and combinations thereof, among others.

Once the one or more solid particles of a lithium cobalt oxide material are separated and obtained, it is delivered into the reactor 340 for further reaction. The reactor 340 includes a gas inlet 333, a reactor inlet 345, and a reactor outlet 347. The reactor inlet 345 is connected to the separator outlet 322A and adapted to receive the solid particles. Optionally, a vessel 325 is adapted to store the solid particles prior to adjusting the amounts of the solid particles delivered into the reactor 340.

The gas inlet 333 of the reactor 340 is coupled to a heating mechanism 380 to heat a gas from a gas source 334 to an annealing temperature of between 400° C. and 1200° C. The heating mechanism 380 can be, for example, an electric heater, a gas-fueled heater, a burner, among other heaters. Additional gas lines can be used to deliver heated air or gas into the reactor 340, if needed. The pre-heated gas can fill the reactor 340 and maintained the internal temperature of the reactor 340, much better and energy efficient than conventional heating of the chamber body of a reactor.

The gas flown inside the reactor 340 is designed to be mixed with the one or more solid particles of a lithium cobalt oxide material and form an oxidized reaction product inside the reactor 340. Thermal energy from the pre-heated gas is used as the energy source for reacting the one or more solid particles of a lithium cobalt oxide material within the reactor 340. The reaction process includes, but not limited to, reduction, decomposition, combination reaction, phase-transformation, re-crystallization, single displacement reaction, double displacement reaction, combustion, isomerization, and combinations thereof. The oxidized reaction product is then going through annealing process for a residence time of between 1 second and ten hours, or longer, depending on the annealing temperature and the type of the precursors initially delivered into the system 300. One embodiment of the invention provides the control of the temperature of the reactor 340 by the temperature of the heated gas. The use of the heated gas as the energy source inside the reactor 340 provides the benefits of fast heat transfer, precise temperature control, uniform temperature distribution therein, and/or easy to scale up, among others.

Once the reactions inside the reactor 340 are complete, for example, upon the formation of desired crystal structure, particle morphology, and particle size, oxidized reaction products are delivered out of the reactor 340 via the reactor outlet 347 and/or a reactor outlet 348. The cooled reaction products include final solid product particles of the crystalized lithium cobalt oxide materials containing, for example, oxidized reaction product particles of the precursor compounds which are suitable as a material of a battery cell.

Optionally, the system 300 includes a gas-solid separator, such as a gas-solid separator 328, which collects the reaction products from the reactor outlet 347 of the reactor 340. The gas-solid separator 328 may be a particle collector, such as cyclone, electrostatic separator, electrostatic precipitator, gravity separator, inertia separator, membrane separator, fluidized beds classifiers electric sieves impactor, leaching separator, elutriator, air classifier, leaching classifier, and combinations thereof.

The gas-solid separator 328 of the system 300 generally includes a separator inlet 321B, a separator outlet 322B and a separator outlet 324B and is used to separate the reaction products into the solid particles and gaseous side products. The gaseous side products may be delivered into a gas abatement device 326B to be treated and released out of the system 300. The gaseous side products separated by the gas-solid separator 328 may generally contain water ($H_2O$) vapor, organic solvent vapor, nitrogen-containing gas, oxygen-containing gas, $O_2$, $O_3$, nitrogen gas ($N_2$), NO, $NO_2$, $NO_2$, $N_2O$, $N_4O$, $NO_3$, $N_2O_3$, $N_2O_4$, $N_2O_5$, $N(NO_2)_3$, carbon-containing gas, carbon dioxide ($CO_2$), CO, hydrogen-containing gas, $H_2$, chlorine-containing gas, $Cl_2$, sulfur-containing gas, $SO_2$, small particles of the solid particles, and combinations thereof. In addition, the system 300 may further include one or more cooling fluid lines 353, 355 connected to the reactor outlet 347 or the separator outlet 322A of the gas solid separator 328 and adapted to cool the reaction products and/or the solid particles. The cooling fluid line 353 is adapted to deliver a cooling fluid (e.g., a gas or liquid) from a source 352 to the separator inlet 321B of the gas-solid separator 328. The cooling fluid line 355 is adapted to deliver a cooling fluid, which may filtered by a filter 354 to remove particles, into a heat exchanger 350.

The heat exchanger 350 is adapted to collect and cool the solid particles and/or reaction products from the gas-solid separator 328 and/or the reactor 340 by flowing a cooling fluid through them. The cooling fluid has a temperature lower than the temperature of the reaction products and the solid particles delivered from the gas-solid separator 328 and/or the reactor 340. The cooling fluid may have a temperature of between 4° C. and 30° C. The cooling fluid may be liquid water, liquid nitrogen, an air, an inert gas or any other gas which would not react to the reaction products.

Final solid products particles are collected and cooled by one or more separators, cooling fluid lines, and/or heat exchangers, and once cooled, the solid particles are delivered out of the system 300 and collected in a final product collector 368. The solid particles may include oxidized form of precursors, such as an oxide material, suitable to be packed into a battery cell 370. Additional pumps may also be installed to achieve the desired pressure gradient.

A process control system 390 can be coupled to the system 300 at various locations to automatically control the manufacturing process performed by the system 300 and adjust various process parameters (e.g., flow rate, mixture ratio, temperature, residence time, etc.) within the system 300. For example, the flow rate of the liquid mixture into the system 300 can be adjusted near the reactant sources 302A, 302B, the liquid mixer 304, or the pump 305. As another example, the droplet size and generation rate of the mist generated by the mist generator 306 can be adjusted. In addition, flow rate and temperature of various gases flown within the gas lines 331A, 331B, 331C, 331D, 333, 353, 355, 515, etc., can be controlled by the process control system 390. In addition, the process control system 390 is adapted to control the temperature and the residence time of various gas-solid mixture and solid particles at desired level at various locations.

Accordingly, a continuous process for producing a material of a battery cell using a system having a mist generator, a drying chamber, one or more gas-solid separators and a reactor is provided. A mist generated from a liquid mixture of one or more metal precursor compounds in desired ratio is mixed with air and dried inside the drying chamber, thereby forming gas-solid mixtures. One or more gas-solid separators are used in the system to separate the gas-solid mixtures from the drying chamber into solid particles packed with the one or more metal precursors and continuously deliver the solid particles into the reactor for further reaction to obtain final solid material particles with desired ratio of two or more intercalated metals.

In one embodiment, preparation and manufacturing of a metal oxide material is provided. Depending on the details and ratios of the metal precursor compounds that are delivered into the system 300, the resulting final solid material particles obtained from the system 300 may be a metal oxide material, a doped metal oxide material, an inorganic metal salts, among others. In addition, the metal oxide materials can exhibit a crystal structure of metals in the shape of layered, spinel, olivine, etc. In addition, the morphology of the final solid product particles (such as the oxidized reaction product prepared using the method 100 and the system 300 as described herein) exists as desired solid powders. The particle sizes of the solid powders range between 10 nm and 100 μm.

In operation, a mist is mixed with a gas flow of a gas inside a mist generator to form a gas-liquid mixture, where the liquid mixture includes a lithium-containing salt compound, and a cobalt-containing salt compound. In addition, the liquid mixture is mixed with a gas flow of another gas inside a drying chamber. It is contemplated that these gas flows are provided to thoroughly mix the liquid mixture to uniformly form into the gas-liquid mixture and assist in carrying the gas-liquid mixture inside the drying chamber. The liquid mixture can be adjusted digitally or manually prepared in a desirable molar ratio of the lithium-containing salt compound, and the cobalt-containing salt compound at a ratio of around x:y inside reactant sources and delivered into one or more liquid mixers.

In one embodiment, the adjusting of the molar ratio of the lithium-containing salt compound, and the cobalt-containing salt compound is performed prior to the forming the mist of the liquid mixture inside a liquid mixer. Desired molar ratio of the lithium-containing salt, and the cobalt-containing salt are digitally or manually measured and delivered from reactant sources to the liquid mixer so that the lithium-containing salt compound, and the cobalt-containing salt compound can be dissolved and/or dispersed in the solvent and mix well into the liquid mixture inside the liquid mixer. The lithium-containing salt compound, and the cobalt-containing salt compound are all soluble in a suitable solvent within the liquid mixture.

In another embodiment, the adjusting of the molar ratio of the lithium-containing salt compound, and the cobalt-containing salt compound compounds is performed simultaneously with the forming the mist of the liquid mixture. The desirable molar ratio of the lithium-containing salt compound, and the cobalt-containing salt compound can be adjusted digitally or manually from each reactant source and delivered into the mist generator to generate the mist of the liquid mixture inside the mist generator.

The liquid mixture comprising the lithium-containing salt compound, and the cobalt-containing salt compound is mixed with a gas flow to form a gas-liquid mixture inside a drying chamber. Then, the gas-liquid mixture is dried at a drying temperature inside the drying chamber to form a gas-solid mixture of solid particles of an oxide material. The gas-solid mixture is continuously delivered into the gas-solid separator which separates the gas-solid mixture into one or more solid particles of the oxide material and waste products.

The one or more solid particles of the oxide material are then delivered into an annealing chamber to be mixed with a flow of a gas. The one or more solid particles of the oxide material are reacted and annealed at an annealing temperature inside the annealing chamber to obtain high quality lithium cobalt oxide materials at desired size, morphology and crystal structure.

EXAMPLE

Suitable Examples

Exemplary material compositions and formulations of the present inventions are shown in Table 1. In group of A (Example #: A1-A5), lithium cobalt oxides materials having a chemical formula of $Li_x Co_y O_z$, is designed and prepared such that a ratio of x:y is equivalent to $M_{LiSalt}:M_{CoSalt}$, wherein x is from 0.95-0.99 ($0.95 \leq x \leq 0.99$), y is 1.0. The annealing temperature and annealing time in group A experiments can be controlled from 900 to 1200° C. for 15 to 20 hours.

For example, in group A, exemplary lithium-containing salt compounds include, but not limited to lithium sulfate (Li2SO4), lithium nitrate (LiNO3), lithium carbonate (Li2CO3), lithium acetate (LiCH2COO), lithium hydroxide (LiOH), lithium formate (LiCHO2), lithium chloride (LiCl), and combinations thereof. Exemplary cobalt-containing salt compounds include, but not limited to cobalt containing salts include, but not limited to, cobalt sulfate ($CoSO_4$), cobalt nitrate ($Co(NO_3)_2$), cobalt acetate ($Co(CH_2COO)_2$), cobalt formate ($Co(CHO_2)_2$), cobalt chloride ($CoCl_2$), and combinations thereof.

TABLE 1

Exemplary LCO materials compositions

| Example # | $M_{LiSalt}$ | $M_{CoSalt}$ | Anneal Temp (° C.) | Anneal Time (hour) |
|---|---|---|---|---|
| A1 | 0.95-0.99 | 1.0 | 900-949 | 15-20 |
| A2 | 0.95-0.99 | 1.0 | 950-999 | 15-20 |
| A3 | 0.95-0.99 | 1.0 | 1000-1049 | 15-20 |
| A4 | 0.95-0.99 | 1.0 | 1050-1100 | 15-20 |
| A5 | 0.95-0.99 | 1.0 | 1100-1200 | 15-20 |

Additional material compositions and formulations are shown in Table 2. In group of B (Example #: B1-B5), lithium cobalt oxides materials having a chemical formula of $Li_xCo_yO_z$, is designed and prepared such that a ratio of x:y is equivalent to $M_{LiSalt}$:$M_{CoSalt}$, wherein x is 1.0, and y is 1.0. The annealing temperature and annealing time in group B experiments can be controlled from 950 to 1200° C. for 15 to 20 hours.

For example, in group B, exemplary lithium-containing salt compounds include, but not limited to lithium sulfate ($Li_2SO_4$), lithium nitrate ($LiNO_3$), lithium carbonate ($Li_2CO_3$), lithium acetate ($LiCH_2COO$), lithium hydroxide (LiOH), lithium formate ($LiCHO_2$), lithium chloride (LiCl), and combinations thereof. Exemplary cobalt-containing salt compounds include, but not limited to cobalt containing salts include, but not limited to, cobalt sulfate ($CoSO_4$), cobalt nitrate ($Co(NO_3)_2$), cobalt acetate ($Co(CH_2COO)_2$), cobalt formate ($Co(CHO_2)_2$), cobalt chloride ($CoCl_2$), and combinations thereof.

TABLE 2

Exemplary LCO materials compositions

| Example # | $M_{LiSalt}$ | $M_{CoSalt}$ | Anneal Temp (° C.) | Anneal Time (hour) |
|---|---|---|---|---|
| B1 | 1.0 | 1.0 | 900-949 | 15-20 |
| B2 | 1.0 | 1.0 | 950-999 | 15-20 |
| B3 | 1.0 | 1.0 | 1000-1049 | 15-20 |
| B4 | 1.0 | 1.0 | 1050-1100 | 15-20 |
| B5 | 1.0 | 1.0 | 1100-1200 | 15-20 |

Additional material compositions and formulations are shown in Table 3. In group of C (Example #: C1-C5), lithium cobalt oxides materials having a chemical formula of $Li_xCo_yO_z$, is designed and prepared such that a ratio of x:y is equivalent to $M_{LiSalt}$:$M_{CoSalt}$, wherein x is from 1.01 to 1.05 (1.01≤x≤1.05), y is 1.0. The annealing temperature and annealing time in group C experiments can be controlled from 900 to 1200° C. for 15 to 20 hours.

For example, in group C, exemplary lithium-containing salt compounds include, but not limited to lithium sulfate (Li2SO4), lithium nitrate (LiNO3), lithium carbonate (Li2CO3), lithium acetate (LiCH2COO), lithium hydroxide (LiOH), lithium formate (LiCHO2), lithium chloride (LiCl), and combinations thereof. Exemplary cobalt-containing salt compounds include, but not limited to cobalt containing salts include, but not limited to, cobalt sulfate ($CoSO_4$), cobalt nitrate ($Co(NO_3)_2$), cobalt acetate ($Co(CH_2COO)_2$), cobalt formate ($Co(CHO_2)_2$), cobalt chloride ($CoCl_2$), and combinations thereof.

TABLE 3

Exemplary LCO materials compositions

| Example # | $M_{LiSalt}$ | $M_{CoSalt}$ | Anneal Temp (° C.) | Anneal Time (hour) |
|---|---|---|---|---|
| C1 | 1.01-1.05 | 1.0 | 900-949 | 15-20 |
| C2 | 1.01-1.05 | 1.0 | 950-999 | 15-20 |
| C3 | 1.01-1.05 | 1.0 | 1000-1049 | 15-20 |
| C4 | 1.01-1.05 | 1.0 | 1050-1100 | 15-20 |
| C5 | 1.01-1.05 | 1.0 | 1100-1200 | 15-20 |

PREPARATION: Lithium cobalt oxide materials were prepared in the following steps: (a) mixing 1 M solutions of forming a liquid mixture having a lithium-containing salt at a molarity of $M_{LiSalt}$, and a cobalt-containing salt at a molarity of $M_{CoSalt}$, wherein the liquid mixture achieves a molar ratio of $M_{LiSalt}$:$M_{CoSalt}$; (b) generating a mist of the liquid mixture inside a mist generator of the drying chamber. The mist of the liquid mixture is mixed with a gas flow of a gas inside a mist generator to form a gas-liquid mixture. In addition, the liquid mixture is mixed with a gas flow of another gas inside a drying chamber; (c) mixing the mist of the liquid mixture with a gas flow to form a gas-liquid mixture inside the drying chamber; (d) dry the gas-liquid mixture at a drying temperature for a time period and form a gas-solid mixture inside the drying chamber; (e) separate the gas-solid mixture into a one or more solid particles of a an oxide material and a waste product; (f) deliver the solid particles of the lithium cobalt oxide material into an annealing chamber to react and anneal the solid particles of the lithium cobalt oxide material in the presence of a flow of a gas at an annealing temperature to obtain crystalized lithium cobalt oxide materials, and anneal the crystalized lithium cobalt oxide materials inside the annealing chamber for a time period to obtain crystalized lithium cobalt oxide materials; (g) cool the crystalized lithium cobalt oxide materials and obtain final solid product particles of crystalized lithium cobalt oxide materials at desired size, morphology and crystal structure.

In some embodiments, the compositions and formulations of the present inventions being tested are as shown in the below Table 4. In one example, the compositions of the present inventions, prepared according to Example #11, have a chemical formula of $Li_xCo_yO_z$, wherein a ratio of x:y is equivalent to $M_{LiSalt}$:$M_{CoSalt}$, wherein x is 0.97, and y is 1.0. The annealing temperature in Example #11 is 950° C. and the annealing time is around 17 hours.

In other examples, the compositions of the present inventions, prepared according to Example #12-15, have a chemical formula of $Li_xCo_yO_z$, wherein a ratio of x:y is equivalent to $M_{LiSalt}$:$M_{CoSalt}$, wherein x is 1.0, and y is 1.0. The annealing temperature in Example #12-15 is 1020° C. and the annealing time is around 17 hours.

In Example #11-15, exemplary lithium-containing salt compounds include, but not limited to, lithium nitrate ($LiNO_3$), exemplary cobalt-containing salt compound include, but not limited to cobalt nitrate ($Co(NO_3)_2$) and combinations. The List of chemistries used for in the present invention is displayed in Table 6.

TABLE 4

Exemplary compositions of measured LCO materials

| Example # | $M_{LiSalt}$ | $M_{CoSalt}$ | Anneal Temp (° C.) | Anneal Time (hour) |
|---|---|---|---|---|
| 11 | 0.97 | 1.0 | 950 | 17 |
| 12 | 1.0 | 1.0 | 1020 | 17 |
| 13 | 1.0 | 1.0 | 1020 | 17 |
| 14 | 1.0 | 1.0 | 1020 | 17 |
| 15 | 1.0 | 1.0 | 1090 | 17 |

Table 5 illustrates testing results of exemplary compositions of measured LCO materials (Example #11-15). One observation is that the testing results of the ratio of the measured LCO material compositions of Li:Co are within an expected range from the prepared molar ratio of $M_{LiSalt}$:$M_{CoSalt}$ being prepared.

TABLE 5

Exemplary compositions of measured LCO materials

| Example # | Li | Ni | Co | Al | Mg | Zr |
|---|---|---|---|---|---|---|
| 11 | 1.0395 | 0.0033 | 0.9952 | 0.0012 | 0.0002 | 0.0000 |
| 12 | 1.0057 | 0.0381 | 0.9466 | 0.0135 | 0.0040 | 0.0000 |
| 13 | 0.9892 | 0.0358 | 0.9491 | 0.0131 | 0.0040 | 0.0000 |
| 14 | 1.0193 | 0.0071 | 0.9916 | 0.0010 | 0.0002 | 0.0003 |
| 15 | 0.9841 | 0.0024 | 0.9944 | 0.0029 | 0.0002 | 0.0000 |

Table 6 illustrates testing results of tap density (TD) and contaminants of crystalized lithium cobalt oxide materials after annealing process of exemplary LCO (Example #11-15). To obtain an ideal lithium cobalt oxide material with high discharge capacity, excellent cycling performance and high-volume energy density, the morphology and tap density of the material have to be controlled precisely during the preparation process. It is found that the tap density of the obtained precursor is around 2.38 (g/cc), which can be attributed to the homogeneous distributions of particles with good packing properties.

TABLE 6

Measurement of tap density (TD) & contaminants of exemplary LCO materials

| Example # | TD (g/cc) | $Li_2CO_3$ | LiOH |
|---|---|---|---|
| 11 | 2.11 | 0.024 | 0 |
| 12 | 2.38 | 0.036 | 0.005 |
| 13 | 2.27 | 0.035 | 0.005 |
| 14 | 2.18 | 0.027 | 0 |
| 15 | 2.10 | 0.031 | 0 |

In one embodiment, Table 7 illustrates testing results of electric capacity and coulombic efficiency (CE) of examples of a battery cells made by lithium cobalt oxide materials annealed at a temperature of 950° C. The battery cells are tested at different cutoff voltages ranged from 4.45 voltage to 4.6 voltage. One observation can be found that the cutoff voltage affect the initial charge and discharge capacity and CE of the battery cell made from exemplary lithium cobalt oxide materials. Another observation can be found that with higher upper cutoff voltage, the battery cell made from exemplary lithium cobalt oxide material demonstrates higher initial discharge capacity as shown in Table 7. To be more specific, under the upper cutoff voltage of 4.6 V, the initial discharge capacity is 223.038 mAh/g, while the initial discharge capacity is 178.564 mAh/g at 4.45 V. Further observation can be found that upper cutoff voltage does not greatly affect coulombic efficiency (CE). For example, the coulombic efficiency (CE) is ranged from 95.2% to 96.5% under different cutoff voltages ranged from 4.45 voltage to 4.6 voltage.

TABLE 7

Measured electric performance of lithium-ion-battery cells made from exemplary LCO materials
Lithium Cobalt Oxide Material Annealed at 950° C.

| Upper cut off voltage, V | 1st charge capacity, mAh/g | 1st discharge capacity, mAh/g | 1st CE, % |
|---|---|---|---|
| 4.45 | 186.037 | 178.564 | 96.0 |
| 4.5 | 197.1 | 189.0 | 95.9 |
| 4.5 | 196.372 | 189.578 | 96.5 |
| 4.6 | 234.224 | 223.038 | 95.2 |

In another embodiment, Table 8 illustrates testing results of electric capacity and coulombic efficiency (CE) of examples of battery cells made by lithium cobalt oxide materials annealed at a temperature of 1020° C. The battery cells are tested at different cutoff voltages ranged from 4.3 voltage to 4.6 voltage. One observation can be found that the cutoff voltage affect the initial charge and discharge capacity and CE of the battery cells made from exemplary lithium cobalt oxide materials. Another observation can be found that with higher upper cutoff voltage, the battery cell made from exemplary lithium cobalt oxide material demonstrates higher initial discharge capacity as shown in Table 8. To be more specific, under the upper cutoff voltage of 4.6 V, the initial discharge capacity is 227.321 mAh/g, while the initial discharge capacity is 158.506 mAh/g at 4.3 V. Further observation can be found that upper cutoff voltage does not greatly affect coulombic efficiency (CE). For example, the coulombic efficiency (CE) is ranged from 96.9% to 97.8% under different cutoff voltages ranged from 4.3 voltage to 4.6 voltage.

TABLE 8

Measured electric performance of lithium-ion-battery cells made from exemplary LCO materials
Lithium Cobalt Oxide Material Annealed at 1020° C.

| Upper cut off voltage, V | 1st charge capacity, mAh/g | 1st discharge capacity, mAh/g | 1st CE, % |
|---|---|---|---|
| 4.3 | 162.452 | 158.506 | 97.6 |
| 4.45 | 185.16 | 180.994 | 97.8 |
| 4.45 | 186 | 181.924 | 97.8 |
| 4.5 | — | 192.404 | — |
| 4.6 | 234.343 | 227.147 | 96.9 |
| 4.6 | 234.501 | 227.321 | 96.9 |

In still another embodiment, Table 9 illustrates testing results of electric capacity and coulombic efficiency (CE) of examples of battery cells made by lithium cobalt oxide materials annealed at a temperature of 1090° C. The battery cells are tested at different cutoff voltages ranged from 4.45 voltage to 4.6 voltage. One observation can be found that the battery samples made by exemplary lithium cobalt oxide materials overall show a high coulombic efficiency (CE) at different cutoff voltages. For example, under the upper cutoff voltage of 4.45 V, the discharge capacity and the coulombic efficiency (CE) is around 173.7 mAh/g and 97.6%, respectively. In another example, under the upper cutoff voltage of 4.5 V, the discharge capacity and coulombic efficiency (CE) is around 186.4 mAh/g and 97.4%, respectively. In still another example, under the upper cutoff voltage of 4.6 V, the discharge capacity and the coulombic efficiency (CE) is around 214.8 mAh/g and 97.0%, respectively.

Referring back to Table 8, further observation can be found that samples of batter cells made from lithium cobalt oxide materials annealed at 1020° C. demonstrate higher discharge capacity than the discharge capacity of the battery samples annealed at 1090° C. To be more specific, the measured discharge capacity of battery cells made from exemplary LCO annealed at 1020° C. is ranged from 181.924 mAh/g to 227.321 mAh/g under different upper voltages ranged from 4.45 V to 4.6 V, while the measured discharge capacity of battery cells made from exemplary LCO annealed at 1090° C. is ranged from 173.7 mAh/g to 214.8 mAh/g.

TABLE 9

Measured electric performance of lithium-ion-battery cells made from exemplary LCO Lithium Cobalt Oxide Material Annealed at 1090° C.

| Upper cut off voltage, V | 1st charge capacity, mAh/g | 1st discharge capacity, mAh/g | 1st CE, % |
|---|---|---|---|
| 4.45 | 178.0 | 173.7 | 97.6 |
| 4.5 | 189.2 | 183.9 | 97.2 |
| 4.5 | 191.3 | 186.4 | 97.4 |
| 4.6 | 221.5 | 214.8 | 97.0 |

Figure 4:
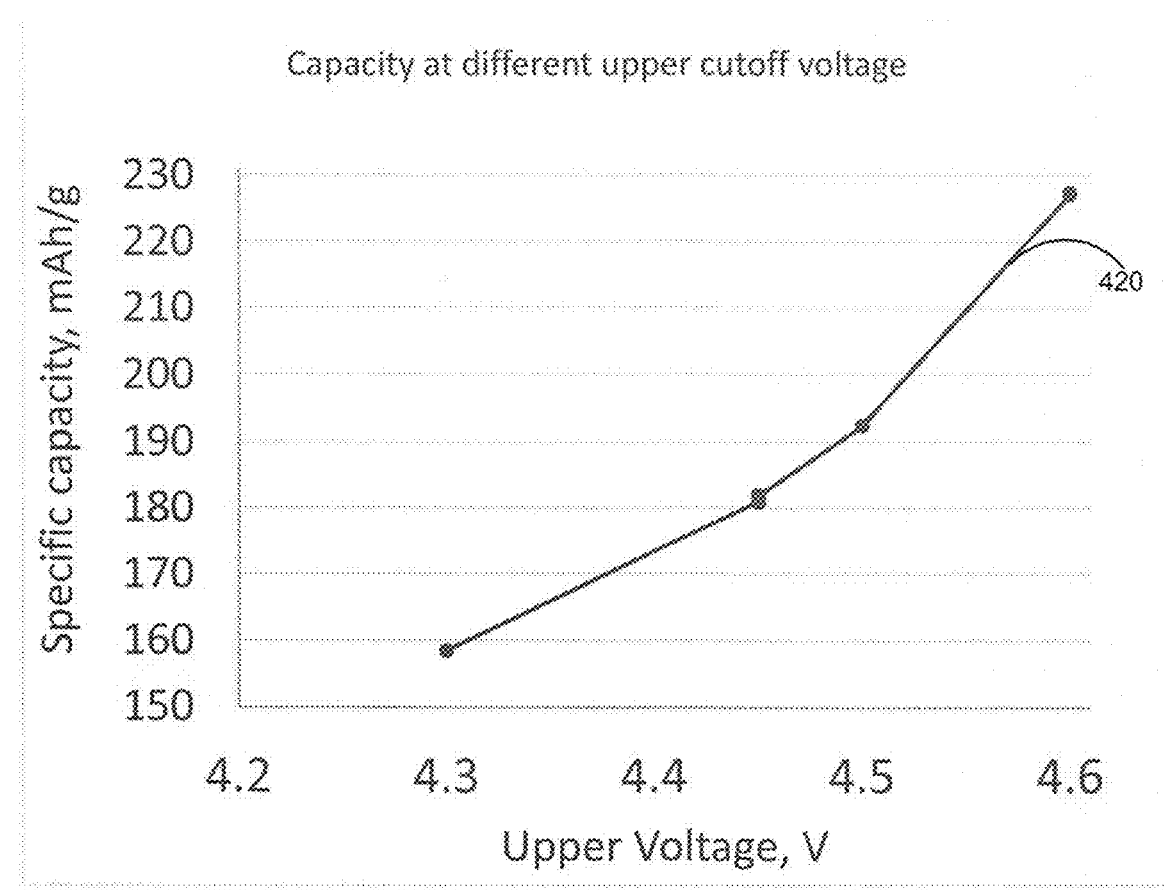
FIG. 4 is a line graph illustrating the discharge profile of electric capacity of lithium-ion battery prepared from one embodiment of cathode materials of the invention.

FIG. 4 illustrates testing results of the discharge profile of electric capacity of lithium-ion batteries prepared from lithium cobalt oxide materials of the invention. In one embodiment, line 420 represents lithium cobalt oxide ($Li_{1.0}Co_{1.0}O_2$).

One observation can be found that the discharge capacities increase higher as the upper cut-off voltage increases. Further observation can be found that at the upper cut-off voltage 4.6 V, the lithium cobalt oxide materials ($Li_{1.0}Co_{01.0}O_2$) have the optimal and the highest discharge capacity of 227.321 mAh/g and 96.9% coulombic efficiency (CE) among other composition ratios of cathode material mixtures as shown in FIG. 4.

FIG. 5A, FIG. 5B, FIG. 5C and FIG. 5D illustrate the discharge profile of electric capacity of lithium-ion batteries at different cut-off voltages (from 4.45 voltage to 4.6 voltage), where the samples of lithium-ion batteries are prepared from exemplary lithium cobalt oxide materials in accordance with the present invention.

Figure 5A:
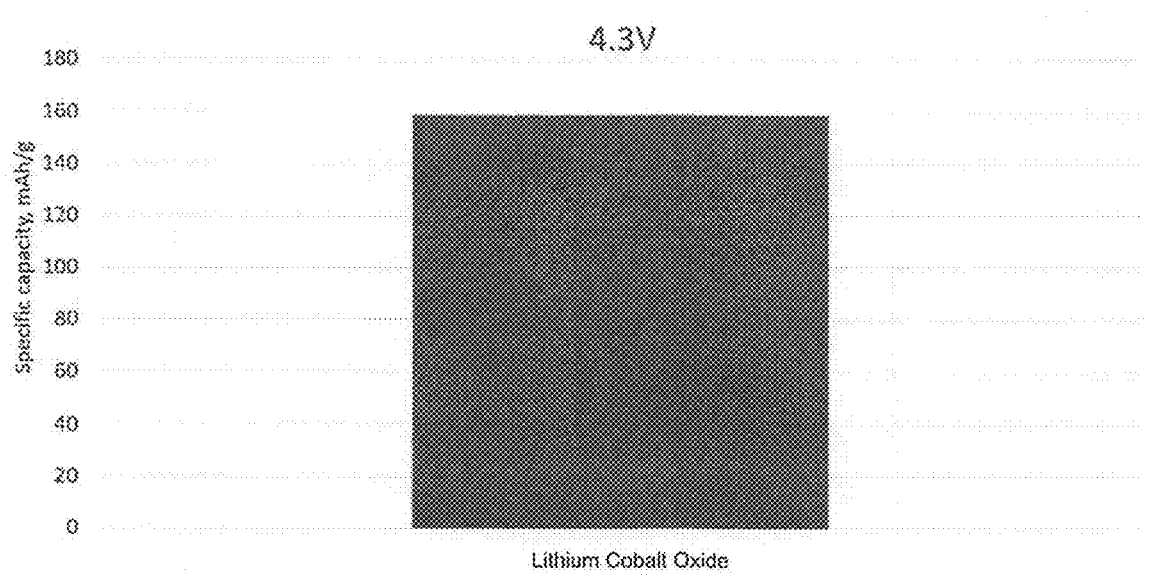
FIG. 5A is a column graph illustrating the discharge profile of electric capacity of one exemplary lithium-ion battery at a specified voltage where the lithium-ion battery is prepared from exemplary cathode materials of the invention.

In one embodiment, FIG. 5A is a column graph illustrating the discharge profile of electric capacity of one example of lithium-ion battery prepared from exemplary lithium cobalt oxide materials of the invention at 4.3 cut-off voltage. One observation can be found that at 4.3 cut-off voltage, the discharge capacities is 158.506 mAh/g.

Figure 5B:
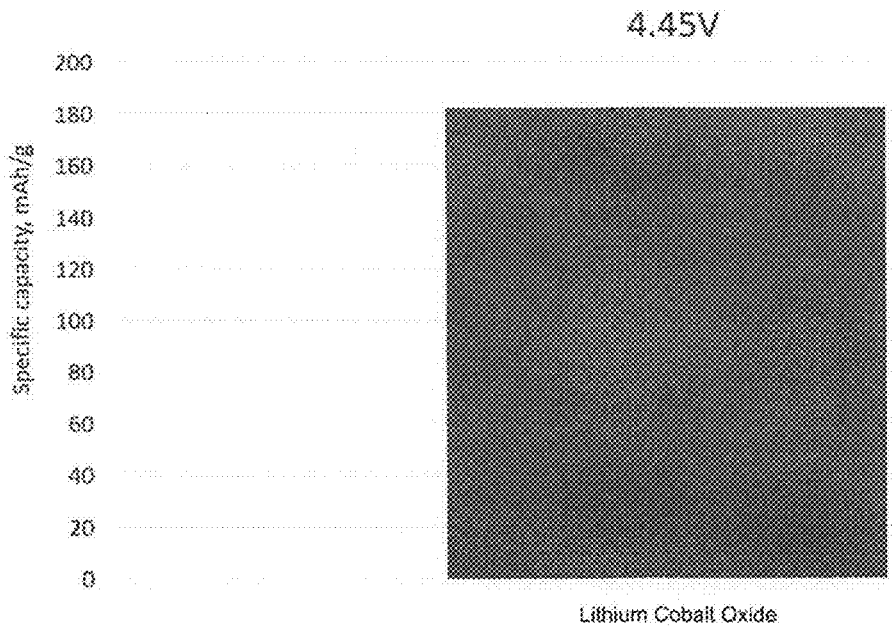
FIG. 5B is a column graph illustrating the discharge profile of electric capacity of another exemplary lithium-ion battery at a specified voltage where the lithium-ion battery is prepared from exemplary cathode materials of the invention.

In another embodiment, FIG. 5B demonstrates a column graph illustrating the discharge profile of electric capacity of another example of lithium-ion battery prepared from exemplary lithium cobalt oxide materials of the invention at 4.45 cut-off voltage. One observation can be found that at 4.45 cut-off voltage, the discharge capacities is 180.994 mAh/g.

Figure 5C:
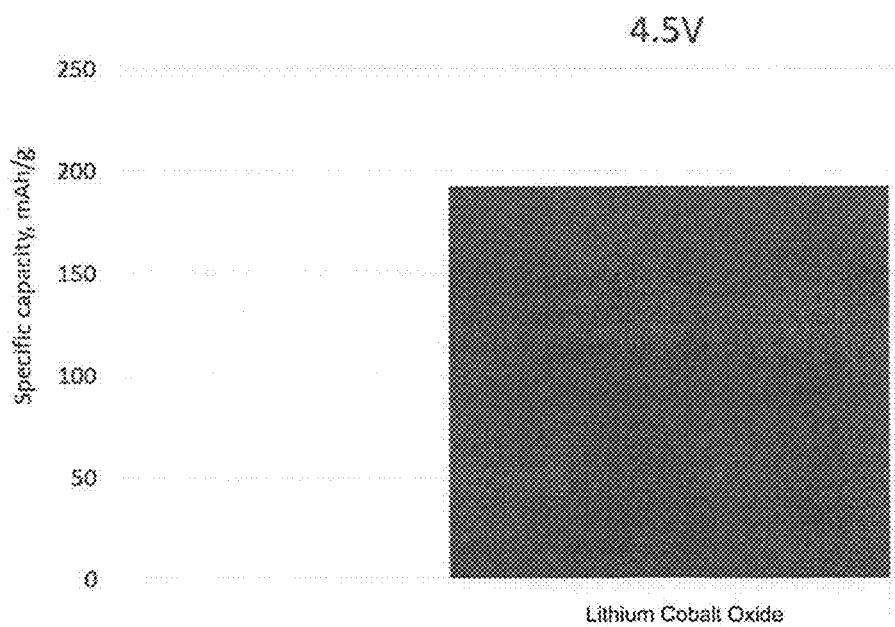
FIG. 5C is a column graph illustrating the discharge profile of electric capacity of lithium-ion battery at a specified voltage where the lithium-ion batteries are prepared from yet another example of cathode material of the invention.

In yet another embodiment, FIG. 5C demonstrates a column graph illustrating the discharge profile of electric capacity of another example of lithium-ion battery prepared from exemplary lithium cobalt oxide materials of the invention at 4.5 cut-off voltage. One observation can be found that at 4.5 cut-off voltage, the discharge capacities is 192.404 mAh/g.

Figure 5D:
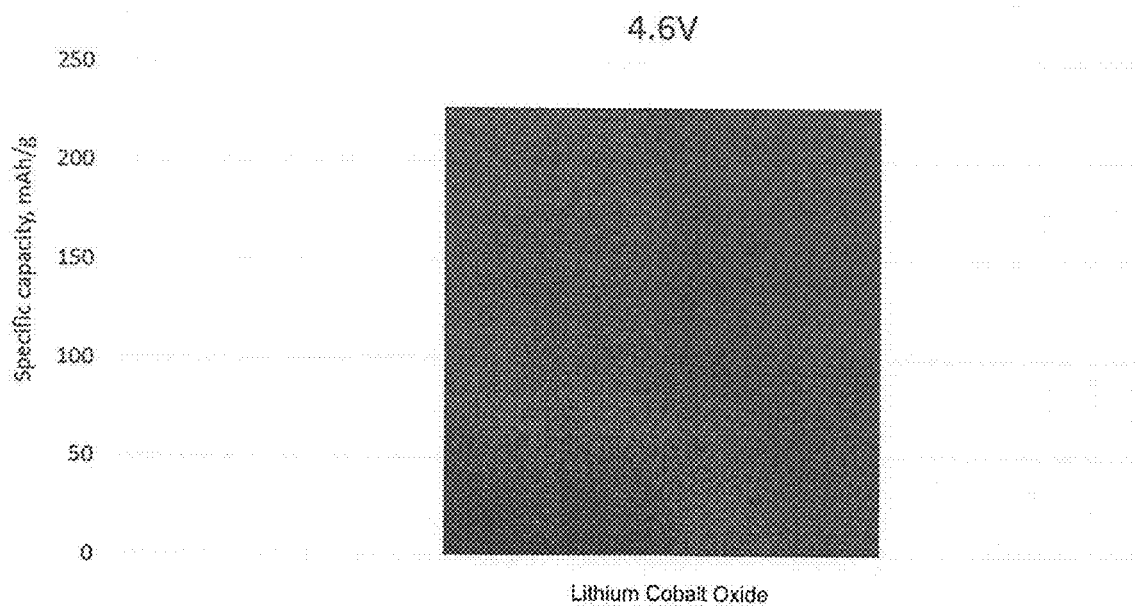
FIG. 5D is a column graph illustrating the discharge profile of electric capacity of still another exemplary lithium-ion battery at a specified voltage where the lithium-ion battery is prepared from exemplary cathode materials of the invention.

In still another embodiment, FIG. 5D demonstrates a column graph illustrating the discharge profile of electric capacity of another example of lithium-ion battery prepared from exemplary lithium cobalt oxide materials of the invention at 4.6 cut-off voltage. One observation can be found that at 4.6 cut-off voltage, the discharge capacities is 227.147 mAh/g.

Figure 6:
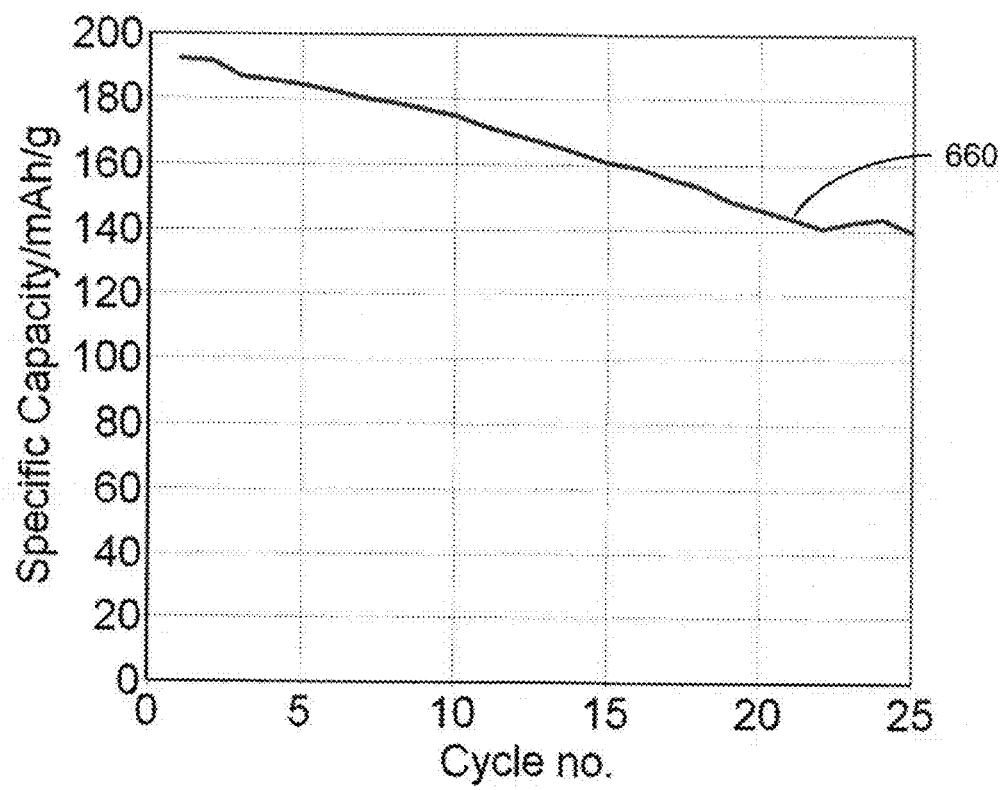
FIG. 6 is a graph illustrating electric charge and discharge cycling performance of battery cells prepared by using one example of cathode materials of the present invention.

FIG. 6 is a graph illustrating cycling performance of a battery cell made from lithium cobalt oxide materials at 4.5 Voltage. In one embodiment, line 660 illustrates the charge cycles of battery cells made from lithium cobalt oxide ($LiCoO_2$). One observation can be seen by FIG. 6 is that Further observation is that the discharge capacity of the battery cell starts to slowly fade by the time it reaches 25th cycle.

Figure 7A:
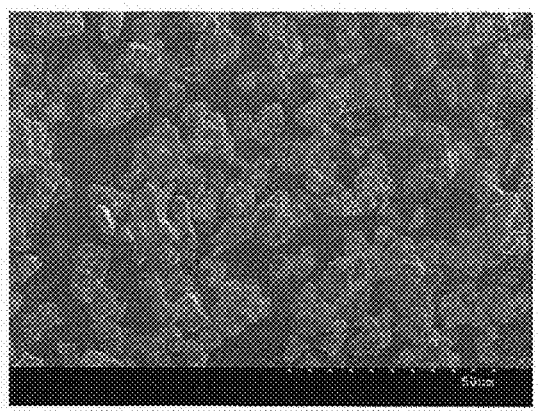
FIG. 7A is a scanning electron microscopy (SEM) image of one example of crystalized lithium cobalt oxide materials of the invention.
Figure 7B:
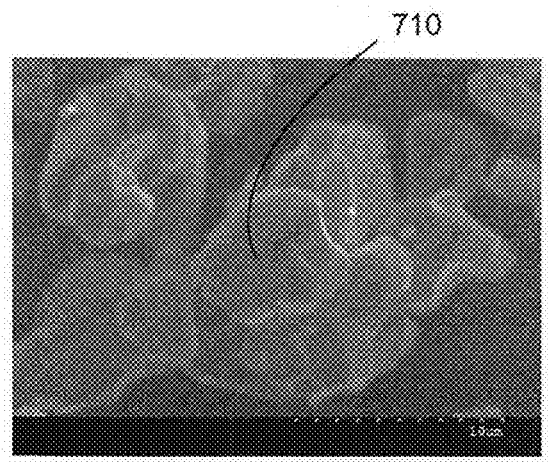
FIG. 7B is a scanning electron microscopy (SEM) image of the example of FIG. 7A in larger magnitude.

FIG. 7A and FIG. 7B are scanning electron microscopy (SEM) images of one example of crystalized lithium cobalt oxide materials ($LiCoO_2$) of the invention after the annealing process at 1020° C. for 17 hours inside the annealing chamber. The SEM Image shows the compositions and formulations of the present inventions having a molar ratio of a lithium-containing salt, and a cobalt-containing salt is $M_{LiSalt}:M_{CoSalt}$. The present invention having a chemical formula of $Li_xCo_yO_z$, wherein a ratio of x:y is equivalent to $M_{LiSalt}:M_{CoSalt}$, wherein x is 0.97, and y is 1.0. In FIG. 7A and FIG. 7B, exemplary lithium-containing salt compound include, but not limited to, lithium nitrate ($LiNO_3$) and combinations thereof, exemplary cobalt-containing salt compound include, but not limited to cobalt nitrate ($Co(NO_3)_2$) and combinations thereof.

FIG. 7A illustrates the morphology and particle size of one example of lithium cobalt oxide material particles at an annealing temperature of 1020° C. for 17 hours having crystalized structure. In addition, FIG. 7B shows a closer look of FIG. 7A. In one example as shown in FIG. 7B one lithium cobalt oxide material particle 710 has a crystal structure.

Figure 7C:
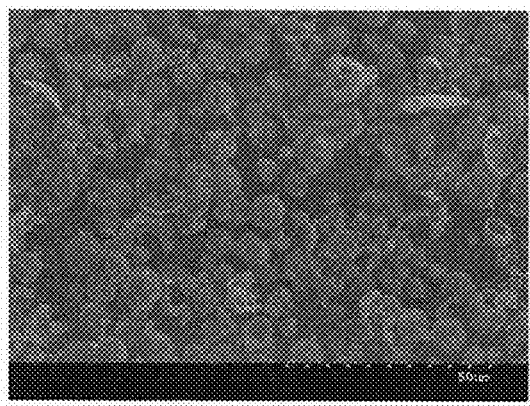
FIG. 7C is a scanning electron microscopy (SEM) image of another embodiment of another example of solid particles of an oxide material after a drying process.
Figure 7D:
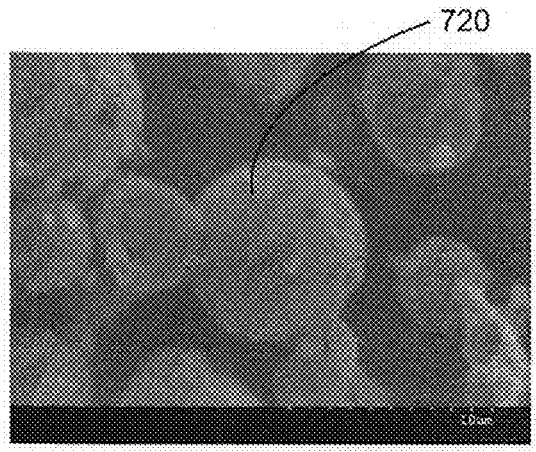
FIG. 7D is a scanning electron microscopy (SEM) image of the example of FIG. 7C in larger magnitude.

FIG. 7C and FIG. 7D are scanning electron microscopy (SEM) images of another example of solid particles of an oxide material ($LiCoO_2$) after a drying process inside a drying chamber. The SEM Image shows the compositions and formulations of the present inventions having a molar ratio of a lithium-containing salt, and a cobalt-containing salt is $M_{LiSalt}:M_{CoSalt}$. The present invention having a chemical formula of $Li_xCo_yO_z$, wherein a ratio of x:y is equivalent to $M_{LiSalt}:M_{CoSalt}$, wherein x is 0.97, and y is 1.0. In FIG. 7C and FIG. 7D, exemplary lithium-containing salt compound include, but not limited to, lithium nitrate ($LiNO_3$) and combinations thereof, exemplary cobalt-containing salt compound include, but not limited to cobalt nitrate ($Co(NO_3)_2$) and combinations thereof.

FIG. 7C illustrates the morphology and particle size of one example of lithium cobalt oxide material particles after the drying process having crystalized structure. In addition, FIG. 7D shows a closer look of FIG. 7C. In one example as shown in FIG. 7D, one solid particle of a lithium cobalt oxide material 720 is spherical in shape.

Figure 8:
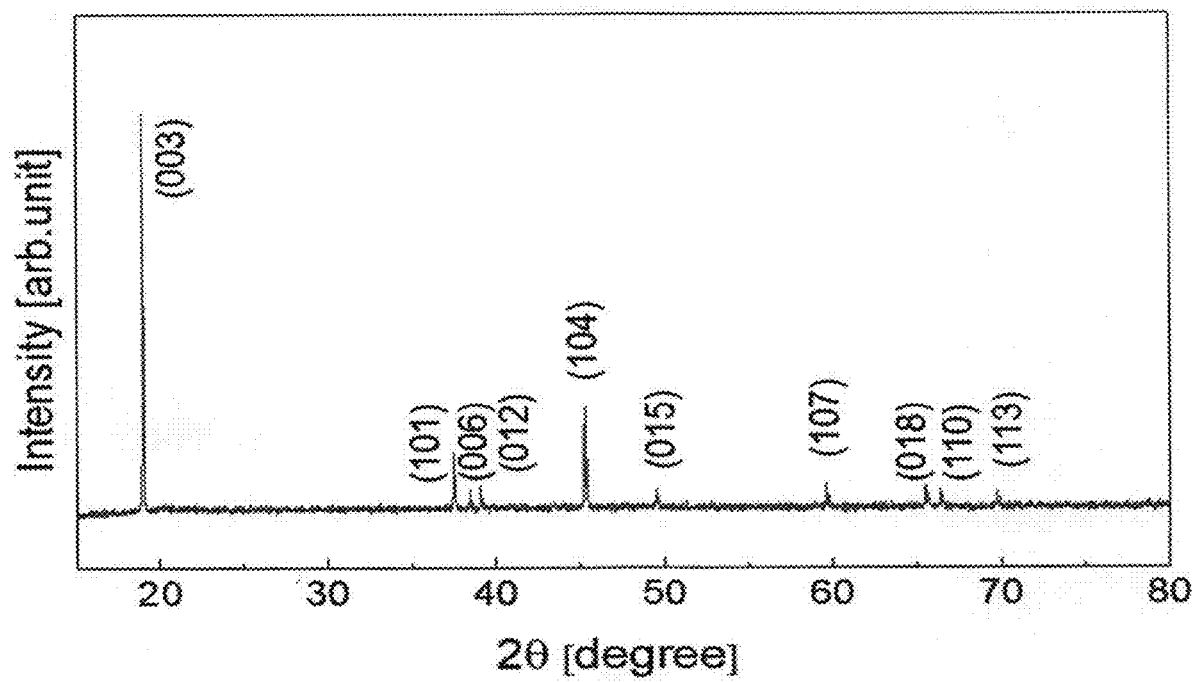
FIG. 8 is an X-ray diffraction (XRD) pattern of one example of crystalized lithium cobalt oxide materials of the invention.

FIG. 8 is an X-ray diffraction (XRD) pattern of one example of crystalized lithium cobalt oxide materials of the invention. The crystal structure of the lithium cobalt oxide materials has been investigated by means of X-ray diffraction. One observation can be found that the example exhibits a LiCoO$_2$ single phase. No second phases are observed.

Further observation as shown in FIG. 8 is that, 003 and 104 represent identifiable peaks. In addition to 003 and 104, other identifiable peaks are observed in 101, 006, 012, 015, 107, 018, 110 and 113. Details of XRD results are shown as Table 10.

TABLE 10

X-ray diffraction (XRD) Results

| Sample | Lithium Cobalt Oxide | |
|---|---|---|
| a [Å] | 2.8149 ± 0.0001 (0.004%) | |
| c [Å] | 14.044 ± 0.007 (0.05%) | |
| c/a | 4.989 | |
| hkl | 003 | 104 |
| 2θ[°] | 18.944 | 45.246 |
| FWHM [°] | 0.09 | 0.08 |
| I (003)/I (104) | | 4.83 |
| hkl | 006 | 012 |
| 2θ[°] | 38.424 | 39.079 |
| Δ2θ[(012)-(006)][°] | | 0.655 |
| hkl | 018 | 110 |
| 2θ[°] | 65.456 | 66.361 |
| Δ2θ[(110)-(018)][°] | | 0.905 |
| $r_I$ | | 0.60 |
| $K_{Fm}$ | | 23.81 |

What is claimed:

1. A method of producing a lithium cobalt oxide material (Li$_x$Co$_y$O$_z$) comprising:
   forming a mist of the liquid mixture, where the liquid mixture is obtained from adjusting a molar ratio M$_{LiSalt}$:M$_{CoSalt}$ of a lithium-containing salt and a cobalt-containing salt to be a ratio of about x:y, and wherein x is 0.9≤x≤1.1, y is 0.9≤y≤1.1, and z is 1.8≤z≤2.2;
   mixing the mist of the liquid mixture with a gas flow to form a gas-liquid mixture;
   drying the gas-liquid mixture to form a gas-solid mixture at a drying temperature;
   forming a gas-solid mixture in the presence of the gas;
   separating the gas-solid mixture into one or more solid particles of an oxide material; and
   annealing the solid particles of the oxide material at an annealing temperature to obtain crystalized particles of the lithium cobalt oxide material, wherein X-ray diffraction (XRD) pattern of the lithium cobalt oxide material exhibits single phase LiCoO$_2$ compound and wherein the lithium cobalt oxide material exhibits no second phases in X-ray diffraction (XRD) pattern, and wherein an initial discharge capacity for cycling performance of a battery cell made from the oxide material is higher than 185 mAh/g at 4.5 Voltage.

2. The method of claim 1, wherein the adjusting of the molar ratio M$_{LiSalt}$:M$_{CoSalt}$ is performed prior to the forming the mist of the liquid mixture.

3. The method of claim 1, wherein the adjusting of the molar ratio M$_{LiSalt}$:M$_{CoSalt}$ is performed simultaneously with the forming the mist of the liquid mixture.

4. The method of claim 1, wherein the drying temperature is 200° C. or higher.

5. The method of claim 1, wherein the annealing temperature is 400° C. or higher.

6. The method of claim 1, wherein a coulombic efficiency (CE) of the battery cell made from the oxide material is larger than 95.2%.

7. The method of claim 1, wherein the liquid mixture is dried in the presence of a first gas that is heated to 200° C. or higher inside a drying chamber and the first gas is delivered into the drying chamber to maintain a drying temperature inside the drying chamber.

8. The method of claim 1, wherein the liquid mixture is dried inside a drying chamber and a drying temperature inside the drying chamber is maintained via a heating element coupled to the drying chamber.

9. The method of claim 1, wherein the solid particles of the oxide material is annealed in the presence of a second gas flow that is heated to 550° C. or higher and the second gas flow is delivered into a reaction chamber to maintain the annealing temperature inside the reaction chamber.

10. The method of claim 1, wherein the solid particles of the oxide material is annealed in the presence of a second gas flow inside a reaction chamber and the annealing temperature inside the reaction chamber is maintained via a heating element coupled to the reaction chamber.

11. The method of claim 1, wherein a specific capacity of the battery cell made from the lithium cobalt oxide material under different cutoff voltages ranged from 4.45 voltage to 4.6 voltage is higher than 190 mAh/g.

12. The method of claim 1, wherein the lithium-containing salt is selected from a group consisting of lithium sulfate (Li$_2$SO$_4$), lithium nitrate (LiNO$_3$), lithium carbonate (Li$_2$CO$_3$), lithium acetate (LiCH$_2$COO), lithium hydroxide (LiOH), lithium formate (LiCHO$_2$), lithium chloride (LiCl), and combinations thereof.

13. The method of claim 1, wherein the cobalt-containing salt is selected from a group consisting of cobalt sulfate (CoSO$_4$), cobalt nitrate (Co(NO$_3$)$_2$), cobalt acetate (Co(CH$_2$COO)$_2$), cobalt formate (Co(CHO$_2$)$_2$), cobalt chloride (CoCl$_2$), and combinations thereof.

14. The method of claim 1, wherein a coulombic efficiency (CE) of the battery cell made from the lithium cobalt oxide material is ranged from 95.2% to 96.5% under different cutoff voltages ranged from 4.45 voltage to 4.6 voltage.

15. A method of preparing a lithium cobalt oxide material doped with at least one metal dopant (Me), comprising:
   forming a mist of a liquid mixture, where the liquid mixture is obtained from adjusting a molar ratio M$_{LiSalt}$:M$_{CoSalt}$ of a lithium-containing salt and a cobalt-containing salt to be a ratio of about x:y, and wherein x is 0.9≤x≤1.1, y is 0.9≤y≤1.1, and z is 1.8≤z≤2.2;
   drying the mist of the liquid mixture in the presence of a gas at a drying temperature of 200° C. or higher;
   forming a gas-solid mixture in the presence of the gas;
   separating the gas solid mixture into one or more solid particles of an oxide material; and
   annealing the solid particles of the oxide material at an annealing temperature of 400° C. or higher in the presence of a gas flow to obtain crystalized particles of the lithium cobalt oxide material, wherein X-ray diffraction (XRD) pattern of the lithium cobalt oxide material exhibits single phase LiCoO$_2$ compound and wherein the lithium cobalt oxide material exhibits no second phases in X-ray diffraction (XRD) pattern, and wherein an initial discharge capacity for cycling performance of a battery cell made from the oxide material is higher than 185 mAh/g at 4.5 Voltage.

16. The method of claim 15, wherein the molar ratio M$_{LiSalt}$:M$_{CoSalt}$ is adjusted prior to forming the mist of the liquid mixture.

17. The method of claim 15, wherein the molar ratio $M_{LiSalt}:M_{CoSalt}$ is adjusted at the same time of forming the mist of the liquid mixture.

18. The method of claim 15, wherein the lithium-containing salt is selected from a group consisting of lithium sulfate ($Li_2SO_4$), lithium nitrate ($LiNO_3$), lithium carbonate ($Li_2CO_3$), lithium acetate ($LiCH_2COO$), lithium hydroxide (LiOH), lithium formate ($LiCHO_2$), lithium chloride (LiCl), and combinations thereof, wherein the cobalt-containing salt is selected from a group consisting of cobalt sulfate ($CoSO_4$), cobalt nitrate ($Co(NO_3)_2$), cobalt acetate ($Co(CH_2COO)_2$), cobalt formate ($Co(CHO_2)_2$), cobalt chloride ($CoCl_2$), and combinations thereof.

19. The method of claim 15, wherein a coulombic efficiency (CE) of the battery cell made from the oxide material is larger than 95.2%.

20. The method of claim 15, wherein a specific capacity of the battery cell made from the oxide material under different cutoff voltages ranged from 4.45 voltage to 4.6 voltage is higher than 190 mAh/g.

21. The method of claim 15, wherein the lithium-containing salt and the cobalt-containing salt are soluble in a suitable solvent to form the liquid mixture, and the suitable solvent is selected from a group consisting of water, alcohol, methanol, isopropyl alcohol, organic solvents, inorganic solvents, organic acids, sulfuric acid ($H_2SO_4$), citric acid ($C_6H_8O_7$), acetic acids ($CH_3COOH$), butyric acid ($C_4H_8O_2$), lactic acid ($C_3H_6O_3$), Nitric acid ($HNO_3$), hydrochloric acid (HCl), ethanol, pyridine, ammonia, acetone, and combinations thereof.

* * * * *